US012572437B1

(12) United States Patent
Kumar et al.

(10) Patent No.: US 12,572,437 B1
(45) Date of Patent: Mar. 10, 2026

(54) AMBIENT TEMPERATURE ESTIMATION BASED ON DEVICE POWER CONSUMPTION

(71) Applicant: Amazon Technologies, Inc., Seattle, WA (US)

(72) Inventors: Karthik Kumar, Seattle, WA (US); Naveen Kumar, Sunnyvale, CA (US); Shankar Ganapathysubramanian, Sunnyvale, CA (US); Andrew Carl Brost, Cool, CA (US); Cuong M. Nguyen, San jose, CA (US); Sai Ravi Teja Pulugurtha, Milpitas, CA (US); Gerald A. Welch, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 986 days.

(21) Appl. No.: 17/591,523

(22) Filed: Feb. 2, 2022

(51) Int. Cl.
*G06F 11/30* (2006.01)
*G06N 20/00* (2019.01)

(52) U.S. Cl.
CPC ......... *G06F 11/3062* (2013.01); *G06N 20/00* (2019.01)

(58) Field of Classification Search
CPC ............................ G06F 11/3062; G06N 20/00
See application file for complete search history.

(56) References Cited

U.S. PATENT DOCUMENTS

| | | | | |
|---|---|---|---|---|
| 9,568,519 | B2 * | 2/2017 | Hwang | G01N 25/20 |
| 10,642,293 | B2 * | 5/2020 | Tiwari | G05D 1/0094 |
| 10,693,576 | B2 * | 6/2020 | Blokh | G06N 20/00 |
| 11,243,711 | B2 * | 2/2022 | Sato | G06F 1/3275 |
| 2019/0339684 | A1 * | 11/2019 | Cella | H04L 67/12 |

OTHER PUBLICATIONS

Wang et al., "Real-time Ambient Temperature Estimation of Mobile Electronic Devices", 2020, IEEE Publication, pp. 1-6 (Year: 2020).*

* cited by examiner

*Primary Examiner* — Elias Desta
(74) *Attorney, Agent, or Firm* — Kilpatrick Townsend & Stockton LLP

(57) ABSTRACT

Techniques for estimating an ambient temperature based on a device power consumption are described. In an example, a system determines first data that indicates an operational temperature of a device, the first data generated by a sensor of the device. The system determines second data that indicates a power consumption of the device. Based at least in part on the first data and the second data, the system determines an ambient temperature of an external environment of the device.

20 Claims, 13 Drawing Sheets

100

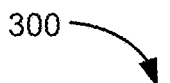

300

```
┌─────────────────────────────────────────────────────────────────┐
│ Determine first data that indicates an operational temperature of │
│ a device, the first data generated by a sensor of the device 302  │
└─────────────────────────────────────────────────────────────────┘
                                │
                                ▼
┌─────────────────────────────────────────────────────────────────┐
│ Determine second data that indicates a power consumption of the   │
│ device 304                                                         │
└─────────────────────────────────────────────────────────────────┘
                                │
                                ▼
┌─────────────────────────────────────────────────────────────────┐
│ Determine historical operational temperature data of the device   │
│ based at least in part on the first data 306                       │
└─────────────────────────────────────────────────────────────────┘
                                │
                                ▼
┌─────────────────────────────────────────────────────────────────┐
│ Determine historical power consumption data of the device based   │
│ at least in part on the second data 308                           │
└─────────────────────────────────────────────────────────────────┘
                                │
                                ▼
┌─────────────────────────────────────────────────────────────────┐
│ Generate an input based at least in part on the first data, the   │
│ second data, the historical operational data, and the historical  │
│ power consumption data 310                                         │
└─────────────────────────────────────────────────────────────────┘
                                │
                                ▼
┌─────────────────────────────────────────────────────────────────┐
│ Provide the input to a machine learning model, the machine        │
│ learning model is trained to predict ambient temperature          │
│ information 312                                                    │
└─────────────────────────────────────────────────────────────────┘
                                │
                                ▼
┌─────────────────────────────────────────────────────────────────┐
│ Determine, using the machine learning model and the input, an     │
│ ambient temperature of an external environment of the device 314  │
└─────────────────────────────────────────────────────────────────┘
```

Figure 4:
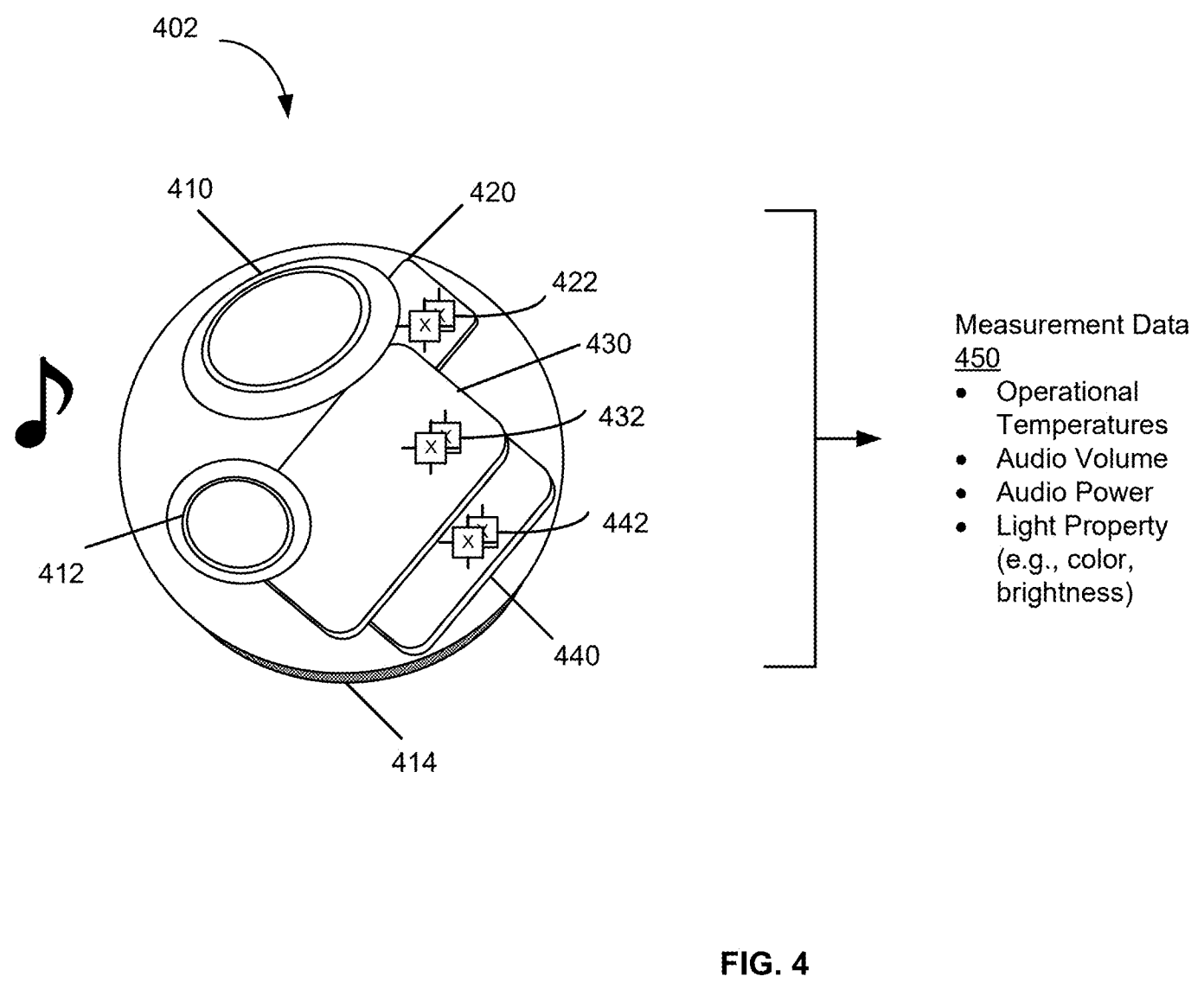

Measurement Data
450
- Operational Temperatures
- Audio Volume
- Audio Power
- Light Property (e.g., color, brightness)

Determine measurement data 702

Store measurement data 704

Generate historical data based on stored measurement data 706

Store historical data 708

Generate input to machine learning model based on measurement data and historical data 710

Determine ambient temperature based on output of machine learning model 712

Initiate action based on ambient temperature 714

Measurement Data
850
- Operational Temperatures
- Electrical Current Amount

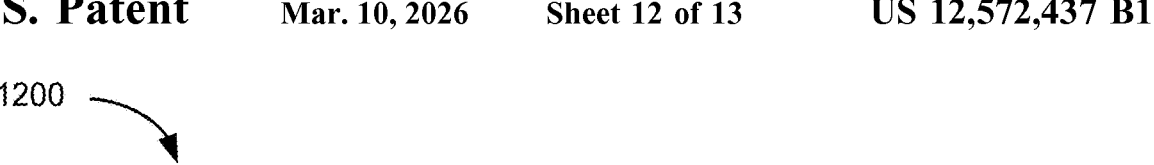

1200

```
┌─────────────────────────────────────────────────────────────┐
│              Receive measurement data 1202                  │
└─────────────────────────────────────────────────────────────┘
                            │
                            ▼
┌─────────────────────────────────────────────────────────────┐
│               Store measurement data 1204                   │
└─────────────────────────────────────────────────────────────┘
                            │
                            ▼
┌─────────────────────────────────────────────────────────────┐
│               Receive historical data  1206                 │
└─────────────────────────────────────────────────────────────┘
                            │
                            ▼
┌─────────────────────────────────────────────────────────────┐
│                Store historical data 1208                   │
└─────────────────────────────────────────────────────────────┘
                            │
                            ▼
┌─────────────────────────────────────────────────────────────┐
│   Generate input to machine learning model based on        │
│     measurement data and historical data 1210              │
└─────────────────────────────────────────────────────────────┘
                            │
                            ▼
┌─────────────────────────────────────────────────────────────┐
│  Determine ambient temperature based on output of machine   │
│                      model 1212                             │
└─────────────────────────────────────────────────────────────┘
                            │
                            ▼
┌─────────────────────────────────────────────────────────────┐
│       Initiate action based on ambient temperature 1214     │
└─────────────────────────────────────────────────────────────┘
```

FIG. 12

AMBIENT TEMPERATURE ESTIMATION BASED ON DEVICE POWER CONSUMPTION

BACKGROUND

Devices can provide different functionalities to users. For example, a device can be used to stream audio content from an online content source. In another example, a device can be used for sleep monitoring. These and other devices can include sensors to monitor proper device operations.

BRIEF DESCRIPTION OF THE DRAWINGS

Various embodiments in accordance with the present disclosure will be described with reference to the drawings, in which:

FIG. 3 illustrates an embodiment of a flow for estimating an ambient temperature based on a device power consumption;

FIG. 4 illustrates an embodiment of a device that generates measurement data usable to estimate an ambient temperature;

FIG. 12 illustrates another embodiment of a flow for using a machine learning model to estimate an ambient temperature.

DETAILED DESCRIPTION

Figure 1:
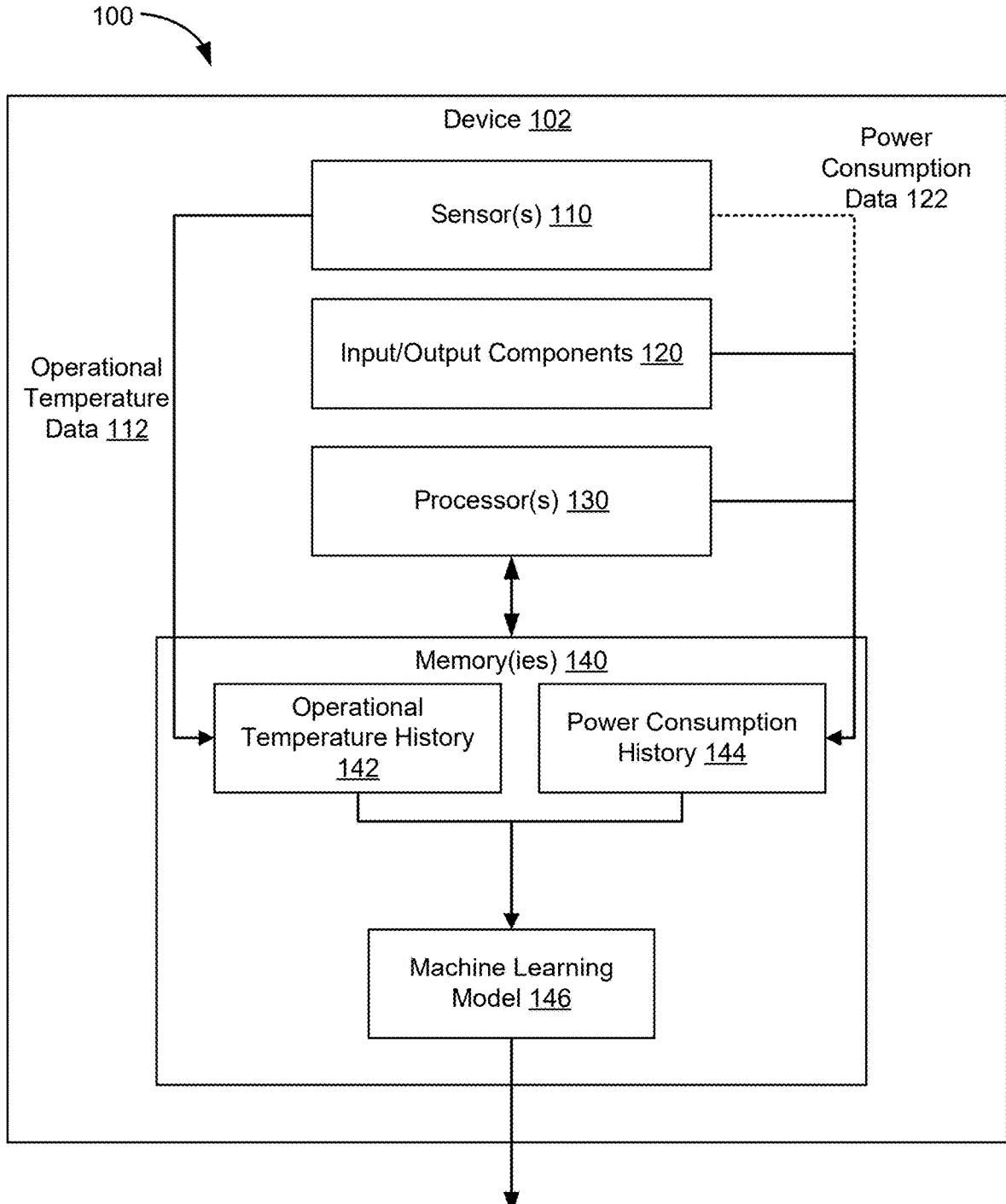
FIG. 1 illustrates an embodiment of a system for estimating an ambient temperature based on a device power consumption.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure relate to, among other things, estimating an ambient temperature of an external environment of a device (e.g., a location that includes the device) based on the power consumption of the device. In an example, a system performs the estimation, where the system can be the device or can include the device and a server. One or more sensors of the device output first sensor data indicating an operational temperature of the device. The device's power consumption can also be determined from second sensor data and/or operational data of the device. Based on the first sensor data and the power consumption, the system estimates the ambient temperature. For instance, the system implements a machine learning model trained to predict ambient temperature information (e.g., to output ambient temperature estimations). From the first sensor data, the system generates a first history of the operational temperature. The system also determines a second history of the power consumption. Based on the first sensor data, the second sensor data and/or operational data, the first history, and/or the second history, the system generates an input to the machine learning model. Based on the inputs, the machine learning model outputs the estimation of the ambient temperature.

To illustrate, consider two examples. In a first example, a smart speaker device is usable to output audio over a set of speakers (one or more woofers and/or one or more tweeters) and to emit light over a set of light sources (e.g., a set of light emitting diodes (LEDs), where the light's color indicates a function of the smart speaker device). The smart speaker device implements a machine learning model trained to predict ambient temperature information. The smart speaker device also includes a set of temperature sensors and a set of thermistors outputting sensor data indicating an operational temperature of the device. The power consumption of the smart speaker can be estimated from an audio envelope of the audio that is output by the one or more speakers. The audio envelope is available as an output from a digital signal processor (DSP) that processes audio data to output the audio. The device can also generate a history of the operational temperature and/or a history of the power consumption, where the history can take the form of exponential moving averages (EMAs). The input to the machine learning model can include, for instance, the sensor data, the value of the power consumption, the audio volume, the color and brightness of the emitted light, and EMAs of sensor data, power consumption value, audio volume, and/or light color and brightness. In turn, the machine learning model can output the ambient temperature of the room where the smart speaker device is located. In this way, the smart speaker device can be used to sense the ambient temperature, and this type of sensing can enable room controls (e.g., by controlling a heating and/or cooling system that controls the ambient temperature).

In a second example, a sleep monitoring device is usable to assist with the determination of sleep phases during a period of time. To do so, the sleep monitoring device uses radar technology that transmits and receives millimeter wave (mm-wave) radio frequency (RF) signals. The sleep monitoring device includes a set of temperature sensors and a set of thermistors outputting sensor data indicating an operational temperature of the device. The sleep monitoring device also includes a current sensor outputting a value that indicates the power consumption of the sleep monitoring device (e.g., the amount of electrical current that the sleep monitoring device is drawing from a power source). The sleep monitoring device generates EMAs of sensor data and power consumption values and sends these EMAs along with the sensor data to a server. In turn, the server implements a machine learning model trained to predict ambient temperature information. The input to the machine learning model can include, for instance, the sensor data and the EMAs. Based on this input, the machine learning model can output the ambient temperature of the room where the sleep monitoring device is located. In this way, the smart speaker device can be used to sense the ambient temperature and this temperature can be used in the determination of the sleep phases.

Embodiments of the present disclosure provide several advantages over approaches for determining an ambient temperature. A first approach includes implementing an ambient temperature sensor in a device. For accurate ambient temperature measurements, the ambient temperature sensor may be thermally isolated from other components of the device. Relative to this first approach, the embodiments can reduce the weight, power consumption, and cost of the device by avoiding the need for a dedicated ambient temperature sensor and for dedicated thermal isolation. A second approach can also implement an ambient temperature sensor, but may avoid the thermal isolation by relying instead on a linear model to account for heat dissipation in the device. This second approach can support accurate ambient temperature estimates in the case of low power devices (e.g., with power consumption less than 200 mW). However, its accuracy can quickly degrade for devices with higher power consumption (e.g., higher than 200 mW) and can vary depending on the design and/or manufacturing of components of the devices (e.g., two units of the same device sourced from different component suppliers can have very different accuracy performances). Relative to the second approach, the embodiments can also reduce the weight, power consumption, and cost of a device while also providing accurate ambient temperature estimations for a wide range of power consumption (e.g., between 1 mW and 20 W) and independently of design and/or manufacturing of device components (e.g., (e.g., two units of the same device sourced from different component suppliers can have very similar accuracy performances). These and other improvements are further described in connection with the next figures.

FIG. 1 illustrates an embodiment of a system 100 for estimating an ambient temperature 104 based on a device power consumption. As illustrated, the system 100 includes a device 102 at a location (e.g., in a room). Functionalities of the system 100 are implemented by the device 102 and, therefore, the description refers herein to the device 102 and equally applies to the system 100. The device 102 can estimate the ambient temperature 104 at the location (e.g., the ambient temperature of the external environment of the device 102) based on an operational temperature of one or more components of the device 102 and on a power consumption of one or more components of the device 102. In an example, a sensor of the device 102, such as a temperature sensor or a thermistor, outputs first sensor data indicating the operational temperature. Another sensor of the device 102, such as a current sensor, outputs second sensor data and/or processing operations of the device 102, resulting in operational data, where the second sensor data and/or the processing data indicate a power consumption of the device 102. The device 102 can maintain a history of the operational temperature and/or a history of the power consumption by storing historical data. Based on the first sensor data, the second sensor data and/or operational data, and/or the historical data, the device 102 outputs an estimate of the ambient temperature 104.

In an example, the device 102 can be operable by a user to provide different user functionalities including, for instance, outputting content (e.g., audio and/or video), providing a smart assistant, providing access to online services, providing sleep monitoring functionalities, and the like. For instance, the device 102 can be a mobile device, a tablet, a laptop, a desktop computer, a smart speaker, a set top box device, a wearable device, a network access point, a network router, a network hub, an Internet of Things (IoT) device, a smart appliance, or another type of user device.

In the illustration of FIG. 1, the device 102 includes a set of sensors 110, a set of input and output (I/O) components 120, a set of processors 130, and a set of memories 140. Each of these components is further described herein next.

A sensor of the set of sensors 110 can generate sensor data that indicates an operational temperature of a component of the device 102. Such sensor data is illustrated in FIG. 1 as operational temperature data 112. The sensor can be mounted to, located in proximity to, or be a part of the component. The sensor can be a temperature sensor, a thermistor, a WiFi sensor, a system on chip (SoC) sensor, or any other type of sensor that can output measurements from which the operational temperature can be derived.

The operational temperature of the device 102 can be the temperature at which the device is operating. The operational temperature of a component of the device 102 (e.g., of a processor) can be a temperature at which the component is operating. Different techniques may be used to determine the operational temperature of the device 102 based on one or more operational temperatures of components thereof. For instance, the device 102 may include a single sensor that outputs sensor data. In this case, the operational temperature determined from the sensor data can correspond to the operational temperature of the device 102. Alternatively, the device 102 may include multiple sensors. In this case, the operational temperature of the device 102 can be determined from a combination of operational temperatures of components thereof. The combination can use a model, such as an averaging model, a weighted averaging model, another linear model, or a non-linear model.

Optionally, a sensor of the set of sensors 110 can output sensor data indicating a power consumption of the device 102. Such sensor data is illustrated in FIG. 1 as power consumption data 122. The sensor can be, for example, a current sensor that measures the electrical current that the device 102 draws from a power source. Additionally or alternatively, the sensor can be a current sensor that measures the electrical current draw by one component of the device 102 (e.g., by the processor). In this case, multiple sensors can be implemented, each measuring the power draw of a corresponding component. The combination of the power draw (e.g., the sum thereof) can correspond to the power consumption of the device 102.

The set of I/O components 120 provide input and output interfaces to a user and/or to other devices. For instance, the set of I/O components 120 can include any of a screen (e.g., a touchscreen), a speaker, a light source (e.g., LEDs), a data port, and/or a wireless interface. When operated, an I/O component can consume power and can become a heat dissipation source that may affect the operational temperature of the device 102 (e.g., increase this operational temperature relative to the ambient temperature 104). One or more sensors of the set of sensors 110 can be mounted to, located in proximity to, or be a part of the I/O and can generate sensor data indicating the operational temperature of the I/O component. Further, the I/O component itself or a corresponding processor (which may but need not be a part of the I/O component) can output operational data (e.g., to output audio by a speaker, audio data can be generated; in this case, the operational data includes the audio data). The power consumption of the device 102 (or of the I/O component) can be determined from the operational data (e.g., an audio envelope of the audio data can indicate the power consumption related to outputting the audio by the speaker). Such operational data usable to determine the power consumption is illustrated in FIG. 1 as power consumption data 122.

The set of processors 130 provide processing functionalities of the device 102. For instance, the set of processors 130 include one or more of a central processing unit, a microprocessor, a DSP, an SoC, and the like. Here also, the processing by a processor can result in operational data from which the power consumption of the processor can be determined. Such operational data usable to determine the power consumption is illustrated in FIG. 1 as power consumption data 122. Further, when operated, a processor can consume power and can become a heat dissipation source that may affect the operational temperature of the device 102 (e.g., increase this operational temperature relative to the ambient temperature 104). One or more sensors of the set of sensors 120 can be mounted to, located in proximity to, or be a part of the processor and can generate sensor data indicating the operational temperature of the processor.

The set of memories 140 store the operational temperature data 112 and the power consumption data 122. When stored, the operational temperature data 112 becomes part of historical operational temperature data (e.g., a set of data indicating the history of the operational temperature over time). In particular, the operational temperature data 112 indicates a value of the operational temperature at a point in time, whereas the historical operational temperature data indicates historical values of the operational temperature over a period of time. When stored, the power consumption data 122 becomes part of historical power consumption data (e.g., a set of data indicating the history of the power consumption over time). In particular, the power consumption data 122 indicates a value of the power consumption at a point in time, whereas the historical power consumption data indicates historical values of the power consumption over a period of time. FIG. 1 illustrates the stored historical operational temperature data and the stored historical power consumption data as an operational temperature history 142 and a power consumption history 144, respectively. The rate at which the operational data 112 is generated and/or stored can be different from the rate at which the power consumption data 122 is generated and/or stored. For instance, every ten seconds, fifteen seconds, or some other time period, the operational data 112 is generated and stored. In comparison, every thirty seconds, forty-five seconds, or some other time period, the power consumption data 122 is generated and stored. Further, and as explained herein above, the operational temperature data 112 can correspond to operational temperatures of different components and can be represented by sensor data generated by different sensors. In this case, the rate at which each sensor data is generated and/or stored can be different. Likewise, power consumption data 122 can correspond to power consumptions of different components and can be represented by different operational data. In this case, the rate at which each operational data is generated and/or stored can be different.

In addition, one or more processors of the set of processors 130 can further process the operational temperature history 142 and the power consumption history 144 to generate historical data that, in turn can be stored, in the set of memories 140 (e.g., as part of the operational temperature history 142 and the power consumption history 144). Historical data related to the operational temperature history 142 (referred to herein as historical operational temperature data) can indicate how the operational temperature of the device 102 (or a component thereof) changed over time (e.g., over each two minutes within the last two hours, or some other past time periods within a past time window). Similarly, historical data related to the power consumption history 144 (referred to herein as historical power consumption data) can indicate how the power consumption of the device 102 (or a component thereof) changed over time (e.g., over each five minutes within the last two hours, or some other past time periods within a past time window). Historical data can be generated using a statistical function applied to the corresponding stored operational temperature data or power consumption data. The statistical function can be, for instance, an averaging function or an EMA function. Here also, the rates of the historical operational temperature data and the historical power consumption data can be different (e.g., the historical data for a temperature sensor can be generated at a two minute rate, whereas that of a current sensor can be generated at a five minute rate). In addition, when historical data is specific to each component, the rates of the historical data of the different components can be different (e.g., the historical data for a temperature sensor can be generated at a two minute rate, whereas that of a thermistor can be generated at a one minute rate).

The set of memories 140 can also store program code (e.g., computer-readable instructions) of a machine learning model 146. The program code can be executed by one or more processors of the set of processors 130. Upon execution, the machine learning model 146 can output an estimation of the ambient temperature 104. This output can be based on an input that includes one or more of the operational temperature data 112, the power consumption data 122, the historical operational temperature data, and/or the historical power consumption data.

In an example, the machine learning model 146 is an instance of a trained machine learning model, such as a trained neural network model. The training can rely on training data generated from multiple devices that are of the same type as the device 102 (referred to herein as a training device). The devices can be set up in a lab environment and/or deployed in a real world environment (e.g., for actual use by end users). The training data can include a measured ambient temperature (e.g., used as ground truth data) of an external environment of a training device and the corresponding operational temperature data, power consumption data, historical operational temperature data, and/or historical power consumption data of the training device. Such training data can be generated for each training device across a wide range of operations of the training device and/or power consumptions of the training device (e.g., by cycling the training device through a steady state where its operational temperature is fairly constant and a transient state where its operational temperature varies in support of different use cases, such as idle, streaming content, outputting a particular output, and/or performing a set of operations). The training can update parameters of the machine learning model through, for example, backpropagation by minimizing a loss function, where the loss function depends on an ambient temperature estimated by the machine learning model and the measured ambient temperature (e.g., the ground truth).

The device 102 of FIG. 1 can support multiple use cases that rely on the estimation of the ambient temperature 104. For example, the device 102 can be used as an accurate sensor that outputs the ambient temperature 104. This output can be used to control systems at the external environment of the device 102 (e.g., a cooling and/or heating system). The ambient temperature 104 can also be used to estimate a humidity at the external environment, as further described in the next figures.

Other use cases include, for instance, estimating a power consumption over time of a dwelling that includes the device 102 (e.g., of a house where the device 102 is located) given the fluctuation of the ambient temperature 104 over time. This power consumption can be compared to power consumptions of other dwellings or of a general location (e.g., a neighborhood) that includes multiple dwellings. More generally, the ambient temperature 104 can affect a property at the external environment of the device 102. This property can be power consumption at the location, an environmental property of the location (e.g., humidity), an optical property at the location (e.g., infrared reflections of objects at the location), a sound property (e.g., ultrasound propagation through the location), and the like. Estimation, control, and/or adjustment of the property can be based at least in part on the ambient temperature 104.

Figure 2:
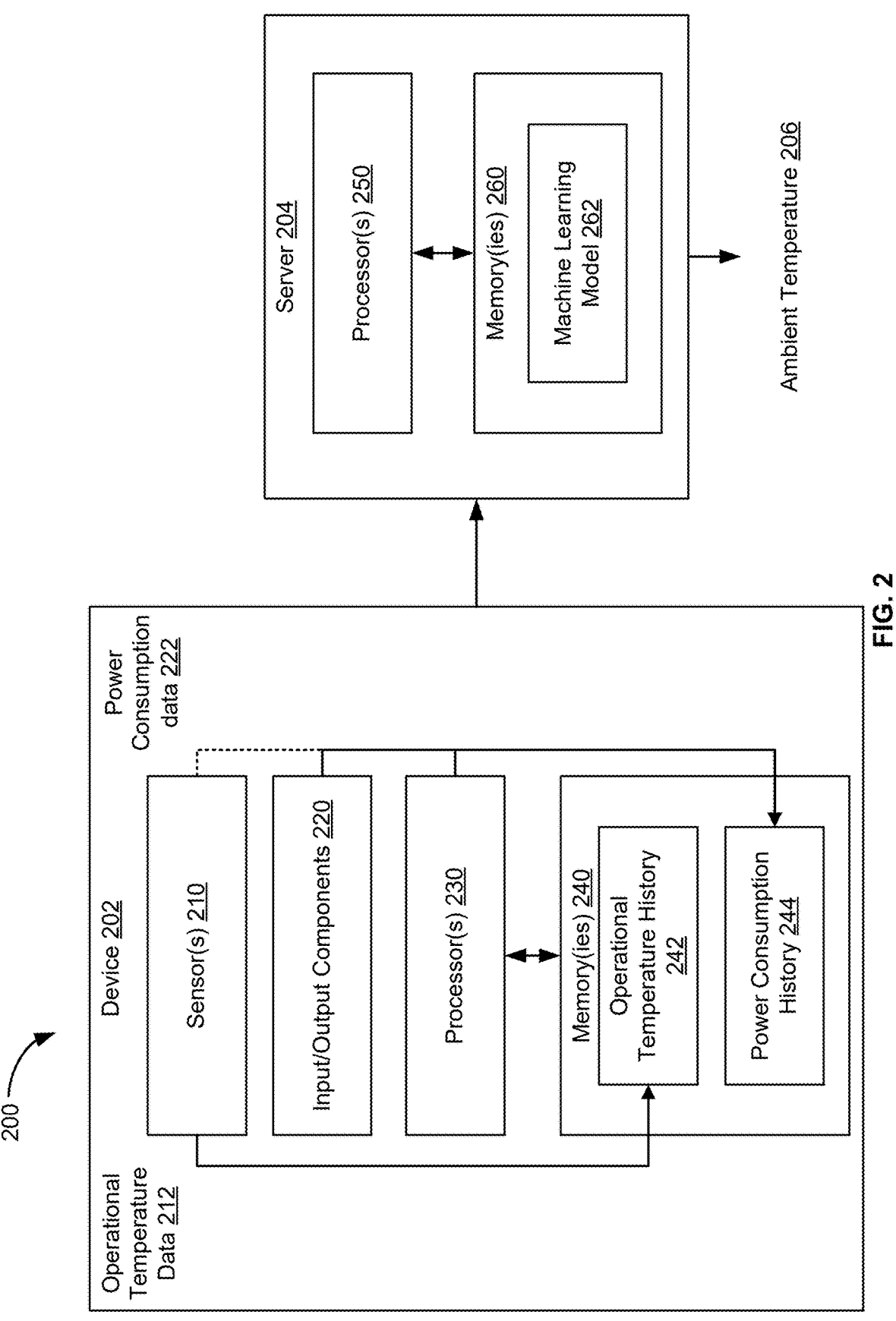
FIG. 2 illustrates another embodiment of a system for estimating an ambient temperature based on a device power consumption.

FIG. 2 illustrates another embodiment of a system 200 for estimating an ambient temperature 206 based on a device power consumption. As illustrated, the system 200 includes a device 202 and a server 204. Functionalities of the system 200 are distributed between the device 202 and the server 204. Whereas the device can generate operational temperature data 212, power consumption data 222, the server 204, and/or the device 202 can generate related historical data, and the server 204 can generate the estimation of the ambient temperature 206 based on one or more of the operational temperature data 212, the power consumption data 222, the historical operational temperature data, and/or the historical power consumption data.

In an example, the device 202 can be similar to the device 102 of FIG. 1 by being operable by a user to provide different user functionalities including, for instance, outputting content (e.g., audio and/or video), providing a smart assistant, providing access to online services, providing sleep monitoring functionalities, and the like. For instance, the device 202 can be a mobile device, a tablet, a laptop, a desktop computer, a smart speaker, a set top box device, a wearable device, a network access point, a network router, a network hub, an IoT device, a smart appliance, or another type of user device.

In the illustration of FIG. 2, the device 202 includes a set of sensors 210, a set of input and output (I/O) components 220, a set of processors 230, and a set of memories 240. Each of these components is further described herein next.

A sensor of the set of sensors 210 can generate sensor data that indicates an operational temperature of a component of the device 202. Such sensor data is illustrated in FIG. 2 as operational temperature data 212. The sensor can be mounted to, located in proximity to, or be a part of the component. The sensor can be a temperature sensor, a thermistor, a WiFi sensor, a system on chip (SoC) sensor, or any other type of sensor that can output measurements from which the operational temperature can be derived.

The operational temperature of the device 202 can be the temperature at which the device is operating. The operational temperature of a component of the device 202 (e.g., of a processor) can be a temperature at which the component is operating. Different techniques may be used to determine the operational temperature of the device 202 based on one or more operational temperatures of components thereof. For instance, the device 202 may include a single sensor that outputs sensor data. In this case, the operational temperature determined from the sensor data can correspond to the operational temperature of the device 202. Alternatively, the device 202 may include multiple sensors. In this case, the operational temperature of the device 202 can be determined from a combination of operational temperatures of components thereof. The combination can use a model, such as an averaging model, a weighted averaging model, another linear model, or a non-linear model.

Optionally, a sensor of the set of sensors 210 can output sensor data indicating a power consumption of the device 202. Such sensor data is illustrated in FIG. 2 as power consumption data 222. The sensor can be, for example, a current sensor that measures the electrical current that the device 202 draws from a power source. Additionally or alternatively, the sensor can be a current sensor that measures the electrical current draw by one component of the device 202 (e.g., by the processor). In this case, multiple sensors can be implemented, each measuring the power draw of a corresponding component. The combination of the power draw (e.g., the sum thereof) can correspond to the power consumption of the device 202.

The set of I/O components 220 provide input and output interfaces to a user and/or to other devices. For instance, the set of I/O components 220 can include any of a screen (e.g., a touchscreen), a speaker, a light source (e.g., LEDs), a data port, and/or a wireless interface. When operated, an I/O component can consume power and can become a heat dissipation source that may affect the operational temperature of the device 202 (e.g., increase this operational temperature relative to the ambient temperature 206). One or more sensors of the set of sensors 210 can be mounted to, located in proximity to, or be a part of the I/O and can generate sensor data indicating the operational temperature of the I/O component. Further, the I/O component itself or a corresponding processor (which may but need not be a part of the I/O component) can output operational data (e.g., to output audio by a speaker, audio data can be generated; in this case, the operational data includes the audio data). The power consumption of the device 202 (or of the I/O component) can be determined from the operational data (e.g., an audio envelope of the audio data can indicate the power consumption related to outputting the audio by the speaker). Such operational data usable to determine the power consumption is illustrated in FIG. 2 as power consumption data 222.

The set of processors 230 provide processing functionalities of the device 202. For instance, the set of processors 230 include one or more of a central processing unit, a microprocessor, a DSP, an SoC, and the like. Here also, the processing by a processor can result in operational data from which the power consumption of the processor can be determined. Such operational data usable to determine the power consumption is illustrated in FIG. 2 as power consumption data 222. Further, when operated, a processor can consume power and can become a heat dissipation source that may affect the operational temperature of the device 202 (e.g., increase this operational temperature relative to the ambient temperature 206). One or more sensors of the set of sensors 220 can be mounted to, located in proximity to, or be a part of the processor and can generate sensor data indicating the operational temperature of the processor.

The set of memories 240 store the operational temperature data 212 and the power consumption data 222. When stored, the operational temperature data 212 becomes part of historical operational temperature data (e.g., a set of data indicating the history of the operational temperature over time). In particular, the operational temperature data 212 indicates a value of the operational temperature at a point in time, whereas the historical operational temperature data indicates historical values of the operational temperature over a period of time. When stored, the power consumption data 222 becomes part of historical power consumption data (e.g., a set of data indicating the history of the power consumption over time). In particular, the power consumption data 222 indicates a value of the power consumption at a point in time, whereas the historical power consumption data indicates historical values of the power consumption over a period of time. FIG. 2 illustrates the stored historical operational temperature data and the stored historical power consumption data as an operational temperature history 242 and a power consumption history 244, respectively. The rate at which the operational data 212 is generated and/or stored can be different from the rate at which the power consumption data 222 is generated and/or stored. For instance, every ten seconds, fifteen seconds, or some other time period, the operational data 212 is generated and stored. In comparison, every thirty seconds, forty-five seconds, or some other time period, the power consumption data 222 is generated and stored. Further, and as explained herein above, the operational temperature data 212 can correspond to operational temperatures of different components and can be represented by sensor data generated by different sensors. In this case, the rate at which each sensor data is generated and/or stored can be different. Likewise, power consumption data 222 can correspond to power consumptions of different components and can be represented by different operational data. In this case, the rate at which each operational data is generated and/or stored can be different.

Optionally, the one or more processors of the set of processors 230 can further process the operational temperature history 242 and the power consumption history 244 to generate historical data that, in turn, can be stored in the set of memories 240 (e.g., as part of the operational temperature history 242 and the power consumption history 244). Otherwise, such processing can be performed by the server 204. Historical data related to the operational temperature history 242 (referred to herein as historical operational temperature data) can indicate how the operational temperature of the device 202 (or a component thereof) changed over time (e.g., over each two minutes within the last two hours, or some other past time periods within a past time window). Similarly, historical data related to the power consumption history 244 (referred to herein as historical power consumption data) can indicate how the power consumption of the device 202 (or a component thereof) changed over time (e.g., over each five minutes within the last two hours, or some other past time periods within a past time window). Historical data can be generated using a statistical function applied to the corresponding stored operational temperature data or power consumption data. The statistical function can be, for instance, an averaging function or an EMA function. Here also, the rates of the historical operational temperature data and the historical power consumption data can be different (e.g., the historical data for a temperature sensor can be generated at a two minute rate, whereas that of a current sensor can be generated at a five minute rate). In addition, when historical data is specific to each component, the rates of the historical data of the different components can be different (e.g., the historical data for a temperature sensor can be generated at a two minute rate, whereas that of a thermistor can be generated at a one minute rate).

The device 202 can send the stored operational temperature data and the stored power consumption data to the server 204. The rate at which the stored operational temperature data is sent can be different from the rate used to transmit the stored power consumption data. For instance, stored operational temperature data is sent every thirty seconds (or some other time period), whereas the stored power consumption data is sent every two minutes (or some other time period). In addition, when the stored data is specific to each component, the rates of sending the different types of stored data can be different.

Optionally, the device 202 can send the historical operational temperature data and the historical power consumption data to the server 204. Here also, the rates for sending such data can be different.

The server 204 can be a set of hardware computing resources (e.g., a hardware server) or a set of software services implemented on hardware computing resources (e.g., a cloud computing server) operable by a service provider. In the illustration of FIG. 2, the server 204 includes a set of processors 250 and a set of memories 260. As applicable, the set of processors 250 can generate the historical operational temperature data and the historical power consumption data.

The set of memories 260 can store program code (e.g., computer-readable instructions) of a machine learning model 262. The program code can be executed by one or more processors of the set of processors 250. Upon execution, the machine learning model 262 can output an estimation of the ambient temperature 206. This output can be based on an input that includes one or more of the operational temperature data 212, the power consumption data 222, the historical operational temperature data, and/or the historical power consumption data.

In an example, the machine learning model 262 is an instance of a trained machine learning model, such as a trained neural network model. The training can rely on training data generated from multiple devices that are of the same type as the device 202 (referred to herein as a training device). The training data can include a measured ambient temperature (e.g., used as ground truth data) of an external environment of a training device and the corresponding operational temperature data, power consumption data, historical operational temperature data, and/or historical power consumption data of the training device. Such training data can be generated for each training device across a wide range of operations of the training device and/or power consumptions of the training device (e.g., by cycling the training device through a steady state where its operational temperature is fairly constant and a transient state where its operational temperature varies in support of different use cases, such as idle, streaming content, outputting a particular output, and/or performing a set of operations). The training can update parameters of the machine learning model through, for example, backpropagation by minimizing a loss function, where the loss function depends on an ambient temperature estimated by the machine learning model and the measured ambient temperature (e.g., the ground truth).

The system 200 of FIG. 2 can support multiple use cases that rely on the estimation of the ambient temperature 206. For example, the device 202 can be used as an accurate sensor usable by the server 204 to output the ambient temperature 206. This output can be used to control systems at the external environment of the device 202 (e.g., cooling and/or heating system). The ambient temperature 206 can also be used to estimate humidity at the external environment, as further described in the next figures.

Other use cases include, for instance, estimating a power consumption over time of a dwelling that includes the device 202 (e.g., of a house where the device 202 is located) given the fluctuation of the ambient temperature 206 over time. This power consumption can be compared to power consumptions of other dwellings or of a general location (e.g., a neighborhood) that includes multiple dwellings. More generally, the ambient temperature 206 can affect a property at the external environment of the device 202. This property can be power consumption at the location, an optical property at the location (e.g., infrared reflections of objects at the location), a sound property (e.g., ultrasound propagation through the location), and the like. Estimation, control, and/or adjustment of the property can be based at least in part on the ambient temperature 206.

FIG. 3 illustrates an embodiment of a flow 300 for estimating an ambient temperature based on a device power consumption. Operations of the flow 300 can be performed by a system that includes a device, such as the system 100 of FIG. 1 or the system 200 of FIG. 2. Some or all of the instructions for performing the operations can be implemented as hardware circuitry and/or stored as computer-readable instructions on a non-transitory computer-readable medium of the system. As implemented, the instructions represent modules that include circuitry or code executable by processor(s) of the system. The use of such instructions configures the system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

As illustrated, the flow 300 may start at operation 302, where the system determines first data that indicates an operational temperature of the device. The first data is generated by a sensor of the device. For instance, the sensor is a temperature sensor or a thermistor. As explained herein above, the device can include multiple sensors, each of which can be mounted to, located in proximity to, or be a part of a component of the device. In such situations, the sensor data generated by each sensor can indicate an operational temperature of a corresponding component, and the collective sensor data can indicate the operational temperature of the device.

In an example, the flow 300 may also include operation 304, where the system determines second data that indicates a power consumption of the device. The second data can be generated by a sensor of the device, such as a current sensor. As explained herein above, the device can include multiple sensors, each of which can be mounted to, located in proximity to, or be a part of a component of the device. Each of such sensors can output sensor data indicating a power consumption of a corresponding component. In such situations, the collective sensor data can indicate the power consumption of the device. Alternatively or additionally, the second data can include operational data generated by one or more components of the device in support of one or more operations of the device. The operational data can indicate the power consumption. For instance, audio data can be generated by a DSP of the device in support of outputting audio by a speaker of the device. This audio data is an example of operational data, where an audio envelope can be generated from the audio data and can indicate the power consumption related to the outputting of the audio.

In an example, the flow 300 may also include operation 306, where the system determines historical operational temperature data of the device based at least in part on the first data. The historical operational temperature data can be third data that indicates a history of the operational temperature over a first period of time. For instance, the first data is generated and stored at a first rate (e.g., every fifteen seconds or some other rate). A statistical function, such as an averaging function or an EMA function, is applied to stored first data to generate historical operational temperature data over the first period of time (e.g., an average or an EMA of the operational temperature is generated every two minutes over the last two hours).

In an example, the flow 300 may also include operation 308, where the system determines historical power consumption data of the device based at least in part on the second data. The historical power consumption data can be fourth data that indicates a history of the power consumption over a second period of time. The second period of time can be the same as or different from the first period of time. For instance, the second data is generated and stored at a second rate (e.g., every thirty seconds or some other rate). A statistical function, such as an averaging function or an EMA function, is applied to stored second data to generate historical power consumption data over the second period of time (e.g., an average or an EMA of the power consumption is generated every five minutes over the last two hours). The fourth data can include the historical power consumption data.

In an example, the flow 300 may also include operation 310, where the system generates an input based at least in part on the first data, the second data, the historical operational data, and the historical power consumption data. For instance, the input can include any or a combination of the operational temperature data, power consumption data, historical operational temperature data, and/or historical power consumption data.

In an example, the flow 300 may also include operation 312, where the system provides the input to a machine learning model. The machine learning model is trained to predict ambient temperature information. For instance, the input can be used as a feature map that is received by an input layer of the machine learning model.

In an example, the flow 300 may also include operation 314, where the system determines, using the machine learning model and the input, an ambient temperature of an external environment of the device. The ambient temperature is predicted by the machine learning model based at least in part on the input. For instance, the machine learning model outputs, based on the input, a prediction for the ambient temperature. The output can be available from an output layer of the machine learning model.

FIG. 4 illustrates an embodiment of a device 402 that generates measurement data 450 usable to estimate an ambient temperature. The device 402 is an example of the device 102 of FIG. 1 or the device 202 of FIG. 2. The measurement data 450 can include operational temperature data and power consumption data, similar to the operational temperature data 112 and 212 and the power consumption data 122 and 222, respectively.

In the illustration of FIG. 4, the device 402 is a smart speaker that supports natural language input (e.g., speech utterance detected by a microphone of the device 402, not shown in FIG. 4), audio output (e.g., text-to-speech output, music streaming, and the like), and notifications about operations of the device 402 (e.g., by emitting light, where the color, pattern, and/or brightness of the light can indicate an operation). Among many components, the device 402 includes a woofer 410 and a tweeter 412 for outputting audio, and set of LEDs 414 for emitting light. The device 402 also includes printed circuit board (PCB) 420, a main logic board (MLB) 430, and an amplifier board (AMP) 440. The PCB 420 includes one or more buttons to turn ON and OFF the device 402, a button thermistor, and a button I²C sensor, illustrated as a set of sensors 422. The button thermistor and/or button I²C sensor generate sensor data indicating an operational temperature of the PCB 420. The MLB 430 includes one or more microprocessors, one or more SoCs, and one or more radio connectivity chips (e.g., to support WiFi, Bluetooth, or any other radio technologies). The MLB 430 also includes an MLB thermistor and a temperature sensor that generate sensor data indicating the operational temperature of the MLB 430. A radio connectivity chip of the MLB 430 can include a radio temperature sensor (e.g., a WiFi temperature sensor) that generates sensor data indicating the operational temperature of the radio connectivity chip. An SoC of the MLB 430 can include, for instance, a DSP to process audio data and a temperature sensor that generates sensor data indicating an operational temperature of the SoC. These different sensors of the MLB 430 are illustrated as a set of sensors 432. The AMP 440 includes one or more amplifiers that can amplify audio signals before being output by the woofer 410 and/or tweeter. The AMP 440 also includes a set of temperature sensors 442 that generate sensor data indicating the operational temperature of the AMP 440. The sensor data generated by the different sets of sensors 422, 432, and 442 can be included in the measurement data, can indicate individually the operational temperature of a corresponding component, and can indicate in combination the operational temperature of the device 402.

As explained herein above, a DSP of the device 402 can generate audio data that can be then used in the amplification of an audio signal output by the woofer 410 and/or tweeter 412. An SoC that includes the DSP can generate an audio envelope of the audio data. The audio envelope indicates the audio power (e.g., the power consumption associated with outputting the audio). Additionally or alternatively, the device 402 can include current sensors that generate sensor data indicating the power consumption associated with outputting the audio. For instance, the current sensor can be installed in series with an amplifier or a speaker (e.g., the woofer 410 or the tweeter 412). The SoC can also indicate the audio volume (e.g., an actual decibel measure of the audio or a qualitative volume level of the audio). The audio power and the audio volume can be parts of the measurement data 450.

The set of LEDs 414 can be controlled via a component (e.g., an SoC, a microprocessor, or the like) of the MLB 430. This component can implement an LED driver and can indicate a characteristic of light emitted by the set of LEDs 414. The characteristic can be one or more of the color and brightness of the light. The characteristic (e.g., color and brightness) can be part of the measurement data 450.

The woofer 410, the tweeter 412, the set of LEDs 414, the PCB 420, the MLB 430, and/or the AMP 440 can become heat sources depending on the operation of the device. Because the measurement data 450 can relate to any or a combination of such components, the measurement data 450 can be used by a machine learning model to estimate an ambient temperature of a location that includes the device 402. The machine learning model can be implemented locally on the device 402 (as in the system 100 of FIG. 1) or remotely on a server (e.g., as in the system 200 of FIG. 2).

As such, the measurement data 450 can indicate the operational temperature of the device 402 (or operational temperatures of components thereof), the audio volume, the audio power, and the light characteristic. Historical data (e.g., averages or EMAs) can be derived from operational temperature(s), the audio volume, the audio power, and/or the light characteristic over time. The most up to date measurement data and the historical data covering a past period of time (e.g., the last two hours) can be used to generate an input to a machine learning model. In turn, the machine learning model can generate an estimation of the ambient temperature based on the input.

Figure 5:
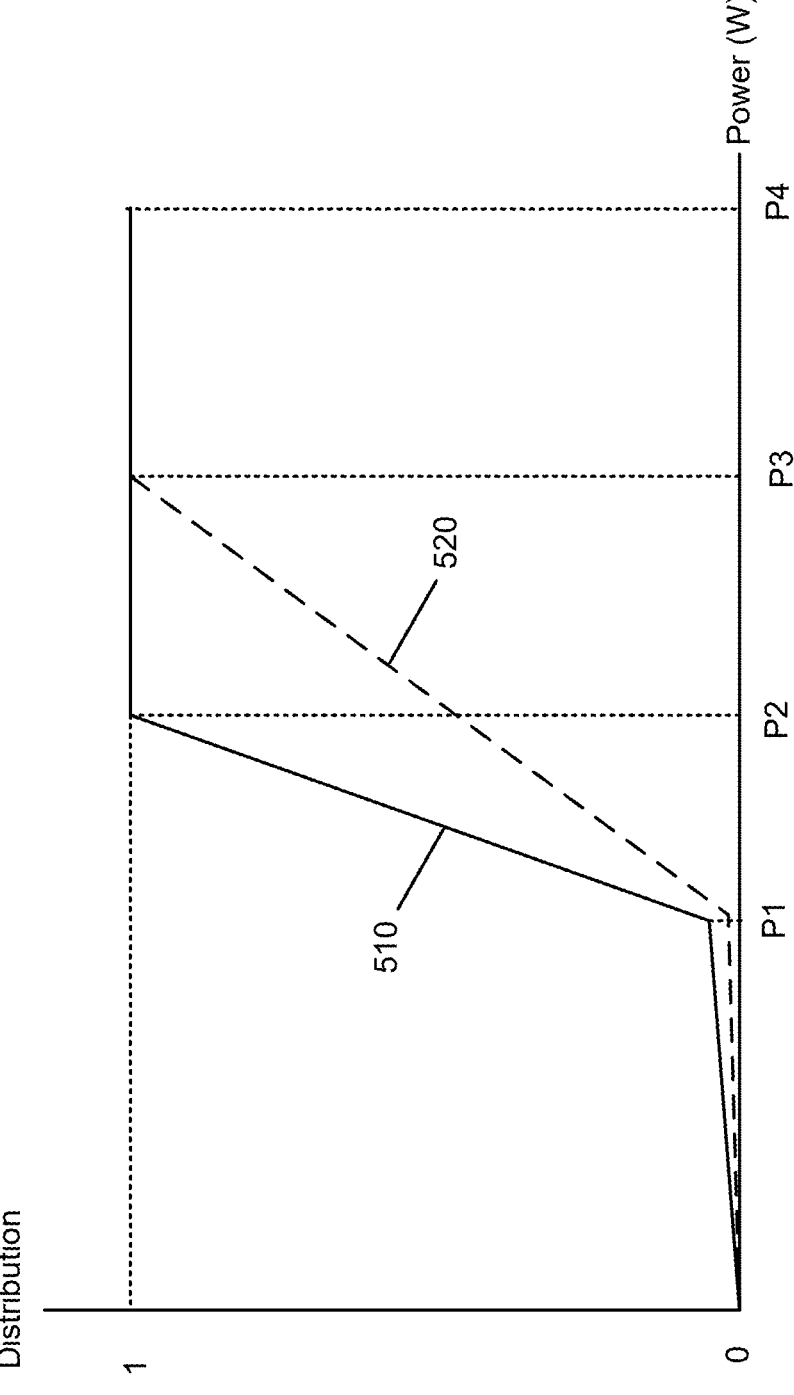
FIG. 5 is a plot illustrating power distribution curves based on an audio volume of an embodiment of a device.

FIG. 5 is a plot illustrating power distribution curves based on an audio volume of an embodiment of a device. The device can be the device 402 of FIG. 4. The horizontal axis shows the power consumption associated with outputting audio by the device, whereas the vertical axis shows a distribution of the power (e.g., a cumulative distribution). The power consumption varies between a lower value (e.g., 0 W) and an upper value (e.g., shown as P4, such as 10 W). The distribution varies between "0" and "1."

Two curves are shown in the figure. A first curve 510 corresponds to outputting the audio (e.g., a set of songs) at a first audio volume and is shown with a solid line. A second curve 520 corresponds to outputting the audio (e.g., the same set of songs) at a second audio volume and is shown with a dashed line. The second audio volume is higher than the first audio volume. As can be seen from these two curves 510 and 520, the distribution of the power varies significantly depending on the audio volume even when the same audio is output by the device. For example, at the first audio volume and as shown by the first curve 510, the distribution slowly increases to reach a first distribution value (e.g., about 0.05) by a first power value (shown as P1, such as 2 W), then quickly increases to reach "1" distribution value by a first power value (shown as P2, such as 4 W). In comparison, at the second audio volume and as shown by the second curve 520, the distribution also slowly increases to reach a first distribution value (e.g., about 0.05) by about the first power value (shown as P1), then relatively less quickly increases to reach "1" distribution value by a third power value (shown as P3 larger than P2, such as 6 W).

As such, the average power distribution across each volume for the audio shows that there can be very high standard deviation depending on the audio volumes of the device. If a machine learning model utilizes the audio volume but not the audio power as an input, the estimated ambient temperature may not be as accurate as when the input also includes the audio power. For this added accuracy, the audio power is used. To avoid the need for implementing specific sensors to measure the audio power, this audio power can be derived from audio data that the device is processing.

In an example, a DSP of the device converts an audio file (e.g. song files) to an I²S signal before it is sent to a speaker of the device. This digital signal contains information about the normalized power and frequencies associated with the audio (e.g., each song). This digital signal can be integrated over a sample time (e.g., within each 15 s window, 100 ms samples are processed to estimate an average power of the 15 s window) to provide the necessary information to distinguish each audio portion (e.g., each audio song). The integration can involve using the audio envelope of the digital signal as a representation of the audio power. Although an average power is described, it may be possible to use instantaneous power (e.g., power determined based on each sample).

Figure 6:
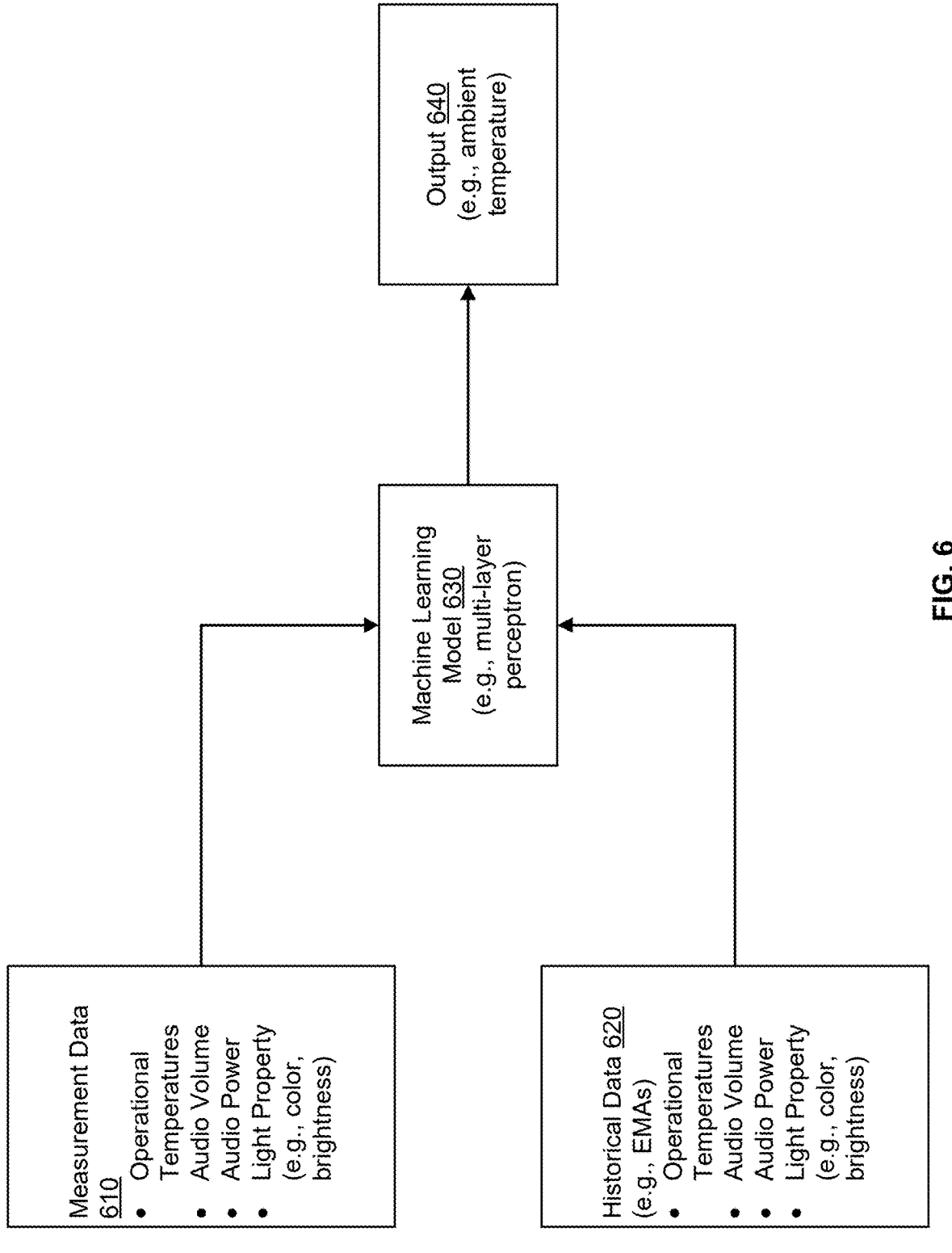
FIG. 6 illustrates an embodiment of inputs to a machine learning model usable to estimate an ambient temperature.

FIG. 6 illustrates an embodiment of inputs to a machine learning model 630 usable to estimate an ambient temperature. In the illustration of FIG. 6, the machine learning model 630 includes a multi-layer perceptron. Based on the inputs, the multi-layer perceptron can generate an output 640, such as one indicating an estimation of the ambient temperature.

The inputs can be of two types. A first type includes measurement data 610, similar to the measurement data 450 of FIG. 4. The second type includes historical data 620, which can be derived from stored measurement data by applying a statistical function thereto. In FIG. 6, the statistical function includes an EMA function.

In an example, the measurement data 610 indicates operational temperatures by including sensor data generated by sensors of the device. Referring back to the device 402 of FIG. 4, the sensors can include a button I²C sensor, a button thermistor, an MLB thermistor, an AMP thermistor, a temperature sensor, and a WiFi temperature sensor. The measurement data 610 also indicates audio volume and audio power, where such indications can be derived from operational data of a DSP or SoC of the device responsible for audio processing. The measurement data 610 also indicates a light characteristic (such as color and brightness of light emitted by the device, if any), where such indications can be derived from operational data of a SoC of the device responsible for controlling LEDs of the device.

In an example, the historical data 620 includes EMAs of the operational temperatures, audio volume, audio power, and light characteristic. An EMA can be generated from corresponding data stored in association with a past time period within a past time window. Since temperature varies with time, using the temporal history can increase the accuracy of predicting the ambient temperature. But storing time history (e.g., history of the operational temperatures, audio volume, audio power, and/or light characteristic) can be expensive (e.g., use a large amount of memory space). Instead EMAs can be utilized as they provide an efficient method to recall the time history. Equation 1 shows the implementation of an EMA where $Y_i$, $S_{t-1}$ and $S_t$ and represents a raw signal, EMA at t−1 and t respectively. Each raw signal (e.g., sensor data, audio volume data, audio power data, light characteristic data) can be sampled at a particular rate and can cover a time window. For instance, samples are generated every fifteen seconds at a one-hundred milliseconds sampling rate. At this sampling rate, to know the temporal history two hours back an α of 0.004 is chosen by setting N to four-hundred and eighty, where N is the ratio of the time period over the sampling rate.

$$S_t = \begin{cases} Y_i, t = 1 \\ \alpha Y_i + (1-\alpha)S_{t-1}, t > 1 \end{cases} \quad \alpha = \frac{2}{N+1}. \quad \text{Equation 1}$$

Figure 7:
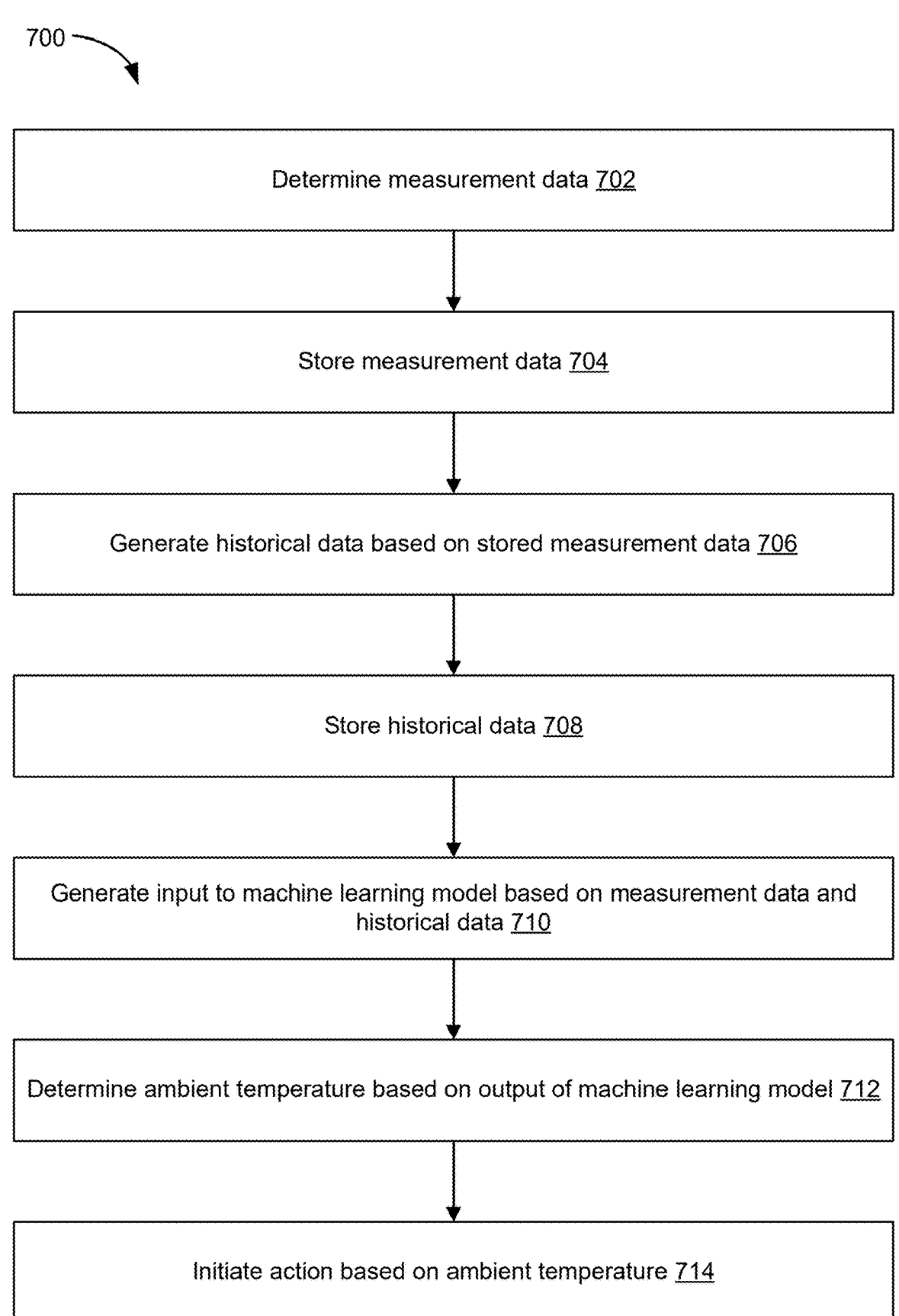
FIG. 7 illustrates an embodiment of a flow for using a machine learning model to estimate an ambient temperature.

FIG. 7 illustrates an embodiment of a flow 700 for using a machine learning model to estimate an ambient temperature. Operations of the flow 700 can be performed by a device, such as the device 402 of FIG. 4. Some or all of the instructions for performing the operations can be implemented as hardware circuitry and/or stored as computer-readable instructions on a non-transitory computer-readable medium of the device. As implemented, the instructions represent modules that include circuitry or code executable by processor(s) of the device. The use of such instructions configures the device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

As illustrated, the flow 700 may start at operation 702, where the device determines measurement data. For instance, the measurement data corresponds to the measurement data 610 of FIG. 6 and can be generated by one or more components of the device. For instance, the measurement data includes sensor data generated by a button I²C sensor, a button thermistor, an MLB thermistor, an AMP thermistor, a temperature sensor, and a WiFi temperature sensor of the device. The measurement data audio volume data and audio power data determined from operational data of a DSP or SoC of the device are responsible for audio processing. The measurement data 610 also includes light characteristic data determined from operational data of a SoC of the device responsible for controlling LEDs of the device.

In an example, the flow 700 may also include operation 704, where the device stores the measurement data. For instance, the measurement data is stored in a memory of the device at a particular rate, such as every fifteen seconds.

In an example, the flow 700 may also include operation 706, where the device generates historical data based on stored measurement data. For example, the historical data includes EMAs generated from each of type of measurement data at a particular rate (e.g., every fifteen seconds) over a time window (e.g., the past two hours). Equation 1 can be used to compute the EMAs.

In an example, the flow 700 may also include operation 708, where the device stores the historical data. For instance, the historical data is stored in the memory of the device at the particular rate, such as every fifteen seconds.

In an example, the flow 700 may also include operation 710, where the device generates an input to a machine learning model based on the measurement data and the historical data. For instance, the latest measurement data stored in the memory are included in the input.

Further, the EMAs that span the time window (e.g., the past two hours) are included in the input. The machine learning model can be hosted locally on the device and the input can be provided thereto as a feature vector.

In an example, the flow 700 may also include operation 712, where the device determines the ambient temperature based on an output of the machine learning model. For instance, the output is based on the input and indicates an estimation of the ambient temperature.

In an example, the flow 700 may also include operation 714, where the device initiates action based on ambient temperature. For instance, the device can be used as an ambient sensor temperature (or, more generally, as a thermostat) that can control, at least in part, an operation of a heating and/or cooling system based on the ambient sensor. The action can be initiated by including control data to increase, decrease, or maintain an air flow of such a system.

Figure 8:
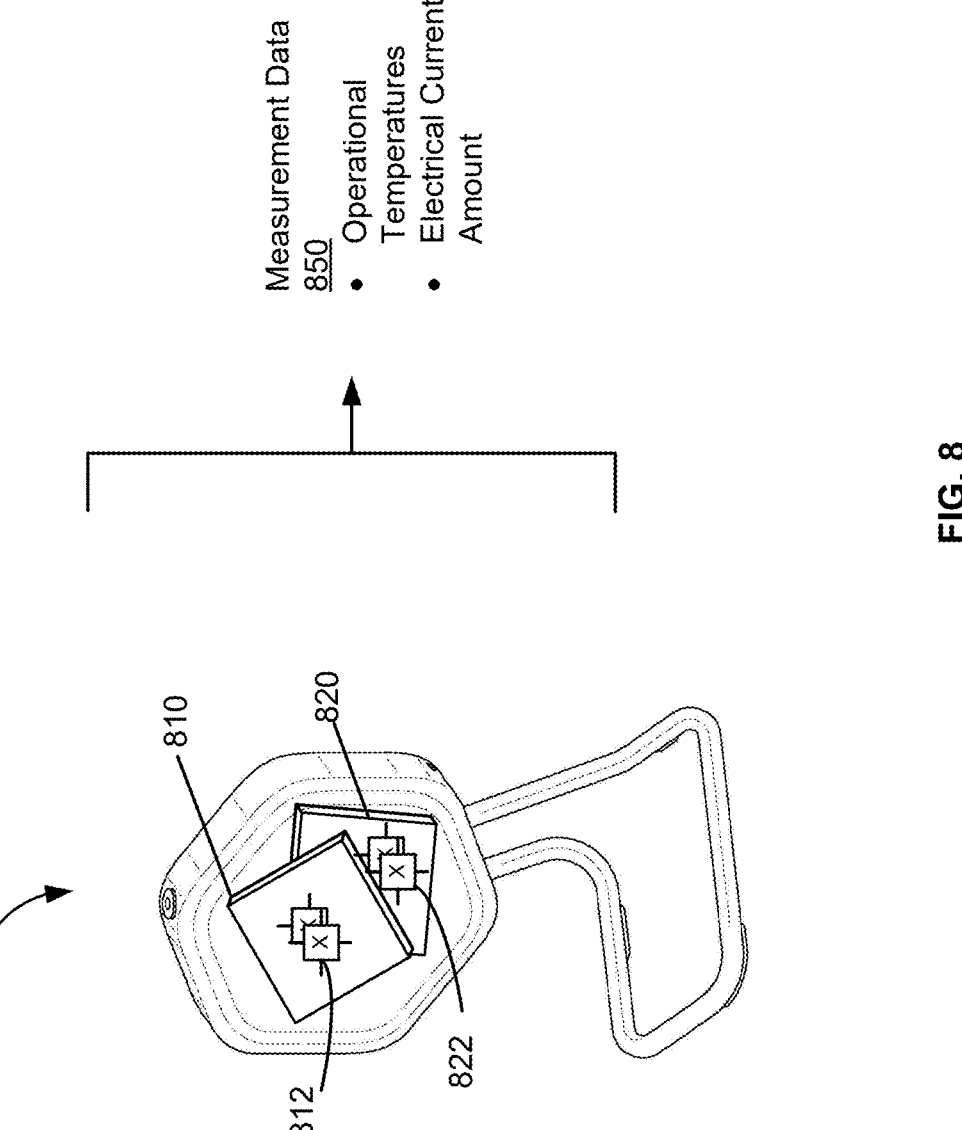
FIG. 8 illustrates another embodiment of a device that generates measurement data usable to estimate an ambient temperature.

FIG. 8 illustrates another embodiment of a device 802 that generates measurement data 850 usable to estimate an ambient temperature. The device 802 is an example of the device 102 of FIG. 1 or the device 202 of FIG. 2. The measurement data 850 can include operational temperature data and power consumption data, similar to the operational temperature data 112 and 212 and the power consumption data 122 and 222, respectively.

In the illustration of FIG. 8, the device 802 is a sleep monitoring device that is usable to assist with the determination of sleep phases during a period of time. In particular, the sleep monitoring device uses radar technology that transmits and receives mm-wave RF signals. Among many components, the device 802 includes a wireless component, shown as a radar board 810, and an MLB 820. The radar board 810 includes RF and other components that form a mm-wave radar. The radar board 810 also includes a set of sensors 812, such as a temperature sensor and a thermistor, that generate sensor data indicating an operational temperature of the radar board 810. The MLB 820 includes one or more microprocessors, one or more SoCs, and one or more radio connectivity chips (e.g., to support WiFi, Bluetooth, or any other radio technologies). The MLB 820 also includes a thermistor and a temperature sensor, illustrated as a set of sensors 822, that generate sensor data indicating the operational temperature of the MLB 820. A radio connectivity chip of the MLB 820 can include a radio temperature sensor (e.g., a WiFi temperature sensor) that generates sensor data indicating the operational temperature of the radio connectivity chip. These different sensors of the MLB 820 are illustrated as a set of sensors 822. The sensor data generated by the different sets of sensors 812 and 822 can be included in the measurement data, can indicate individually the operational temperature of a corresponding component, and can indicate in combination the operational temperature of the device 802.

The device 802 can also include a set of sensors, such as current sensors, that output sensor data indicating a power consumption of the device 802. Such sensors can be included in the set of sensors 812 and 822, whereby the power consumption of the radar board 810 and the power consumption of the MLB 820 are indicated by the sensor data, and the combination (e.g., the sum) of these two power consumptions can indicate the power consumption of the device 802. Additionally or alternatively, a current sensor can be installed in series with a power source and its sensor data can indicate the power consumption of the device 802. The power consumption can be an average power consumption over a time window (e.g., 15s time window) generated by sampling the sensor data (e.g., at a 100 ms sampling rate). Additionally or alternatively, the power consumption can be an average power consumption (e.g., determined based on each sample).

As such, the measurement data 850 can indicate the operational temperature of the device 802 (or operational temperatures of components thereof) and power consumption of the device 802 (or power consumption of components thereof). Historical data (e.g., averages or EMAs) can be derived from operational temperature(s) and/or power consumption(s) over time. The most up to date measurement data and the historical data covering a past period of time (e.g., the last two hours) can be used to generate an input to a machine learning model. In turn, the machine learning model can generate an estimation of the ambient temperature based on the input.

Although not illustrated in FIG. 8, the device 802 can include other components, such as I/O components and/or or processors, that, in operation, can become heat dissipation sources that impact the operational temperature of the device 802. Some of these components can be similar to the components of the device 402 such as, for instance, a set of LEDs and/or a set of speakers. Data related to such components (e.g., LED color, brightness, and history thereof if the device 802 includes the set of LEDs; volume level and history thereof if the device 802 includes the set of speakers) can be part of the data used to estimate the ambient temperature.

In an example, the device 802 is shown with a housing and stand to support the housing. The housing encloses components of the device 802, including the radar board 810 and the MLB 820. The device 802 is supported by the stand that rests on a supporting surface. The stand extends along a vertical axis, which may be parallel to a vertical axis of the housing, e.g., from the top to the bottom of the housing. The stand is a wire frame stand that connects to the housing as shown. The wire frame may include a rigid or semi-rigid core covered or coated with a second material. The rigid core may provide strength and support while the second material provides for an aesthetic look and feel, such as to cushion the stand. The stand includes feet to resist slipping and movement of the stand against a supporting surface. The feet may be rubber feet that provide for an increased coefficient of friction between the stand and the supporting surface to resist movement of the device 802.

The housing has a hexagonal shape at an outer perimeter, to accommodate wireless components (e.g., radar components) as shown, while maintaining a small profile and thereby remaining unobtrusive. The housing is formed of several components. The components of the housing are assembled together and may be formed of a plastic, metal, composite, or any other suitable structural material. In some embodiments, the housing may be assembled of additional components or may be formed as a unibody shell with an access panel to provide access to an interior of the housing. A perimeter and a back panel of the housing may each be formed of a material that is non-RF transparent material.

The front surface of the housing acts as a radome for the radar board 810 stored within the housing such that the radar board 810 is protected while also enabling transmission of RF waves through the front surface. The front surface is transparent to RF signals, particularly to millimeter wave RF signals such as are emitted from the device 802. The front surface may be permanently joined with the perimeter of the housing or may be removable from the housing. The front surface may be composed of a single piece or may be formed of multiple segments or parts. The front surface is flat, but may, in some embodiments, have a dome-like shape extending from the housing. In some embodiments, the housing, with the exception of the front surface, may block RF signals to prevent interference and noise from other potential sources.

The housing includes an indicator light pipe and an input mechanism. The indicator light pipe provides for light signals to be emitted from within the housing through the front surface, for example to provide feedback or information to a user regarding an operational status of the device 802. The indicator light pipe may be positioned around the perimeter, on the back, or any other position on the housing. The input mechanism is shown as a button positioned at the top end of the housing and enables a user to interact with the device 802, such as to initiate a cycle or process. In some embodiments, the activation button may include additional components, such as an indicator light to emit light in a manner similar to the indicator light pipe, and an ambient light sensor to gather data relating to a level of ambient light in the environment surrounding the device 802. The data from the ambient light sensor may be sent to the MLB 820 enclosed within the housing for processing as well as communication with other devices outside of the housing.

Figure 9:
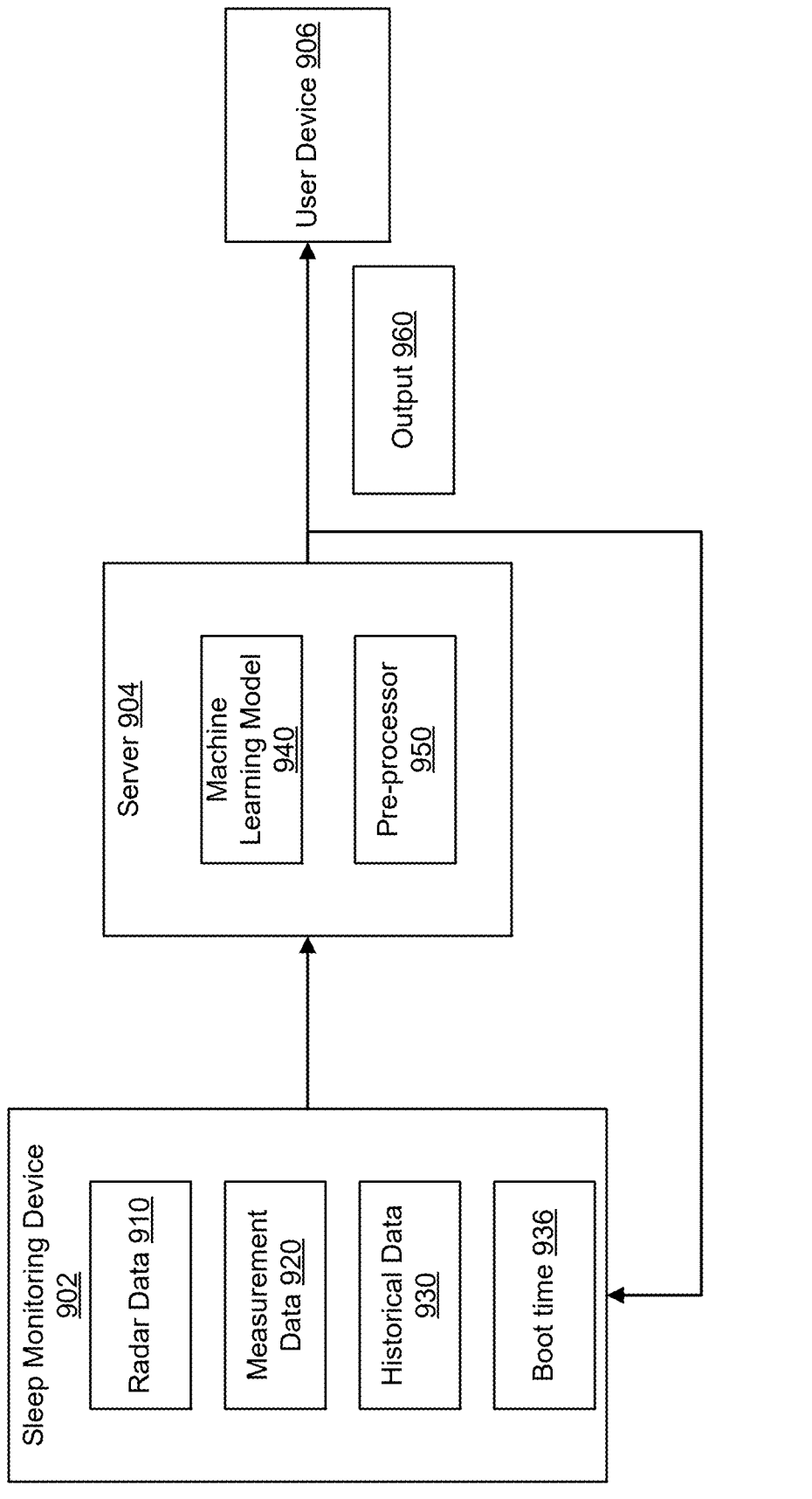
FIG. 9 illustrates an embodiment of a device-server architecture usable to estimate an ambient temperature.

FIG. 9 illustrates an embodiment of a device-server architecture usable to estimate an ambient temperature. As illustrated, the device-server architecture includes a sleep monitoring device 902, which is an example of the device 802 of FIG. 8, and a server 904, which is an example of the server 204 of FIG. 2.

In an example, the sleep monitoring device 902 can be positioned in a space within a physical environment (such as by being placed on a nightstand in a bedroom). The sleep monitoring device 902 can be communicatively coupled with the server 904 over a data network, such as one that includes the Internet. The server 904 can be communicatively coupled with a user device 906 (e.g., a mobile device, such as a smartphone). A direct data connection need not exist between the sleep monitoring device 902 and the user device 906. Instead, the server 904 can facilitate communications therebetween.

In an embodiment, the sleep monitoring device 902 implements mm-wave RF technology to generate and send radar data 910 to the server 904. At a start of a sleep session, the sleep monitoring device 902 can transmit mm-wave RF signals (e.g., in the range of thirty to three-hundred GHz, such as around sixty GHz). The reflected mm-wave RF signals are received and processed into the radar data 910, where this radar data 910 indicates macro-level motion (e.g., a motion of a target on a bed in the space) and micro-level motion (e.g., a displacement of the target's chest indicating a respiratory rate). The radar data 910 may be generated at a particular data rate, such as every one hundred milliseconds. The sleep monitoring device 902 can also include a set of sensors that generate sensor data related to the sleep monitoring device 902, where the sensor data includes measurement data 920 (similar to the measurement data 850 of FIG. 8). The measurement data 920 can be sent to the server 904. The sleep monitoring device 902 can also generate historical data 930, such as EMAs, based on stored measurement data. In addition, the sleep monitoring device can store timestamp data indicating a boot time 936 of the sleep monitoring device 902 (e.g., a time stamp corresponding to a boot event, where the boot event can be a power ON of the sleep monitoring device 902). The boot time can be associated with the historical data 930, where, for example, an EMA can be generated and/or stored at a time and this time can be defined relatively to the boot time 936 (e.g., the EMA generated two minutes after the boot time 936 or stored five minutes before a boot event indicating a restart of the sleep monitoring device 902). The radar data 910, the measurement data 920, the historical data 930, and timing data of the boot time 936 can be sent periodically at a particular transmission rate, such as every five minutes, to constitute a data stream from the sleep monitoring device 902 to the server 904. In some embodiments, the radar data 910, the measurement data 920, the historical data 930, and timing data of the boot time 936 may be transmitted asynchronously, e.g., the radar data 910 may be transmitted every five minutes, whereas the remaining data may be sent every thirty minutes.

The server 904 receives the radar data 910 from the sleep monitoring device 902 and processes this data to generate, among other things, sleep session data. To do so, the server 904 hosts a sleep monitoring module that analyzes the radar data 910. Different analysis techniques are possible. In one embodiment, a machine learning (ML) model can be trained to detect sleep stages based on the radar data 910. Statistical analysis can be performed to determine, for instance, average time or some other metrics per sleep stage. Pattern detection and plotting algorithms can be used to detect and illustrate patterns from the metrics and/or from the radar data 910 (e.g., to show respiratory rate change per sleep stage, and the average temperature of the space during the sleep stage). Some or all of the output data of the application modules can be included in the sleep session data depending on, for example, user preferences and settings. The sleep session data can be sent to the user device 906.

The user device 906 can receive and present the sleep session data. In some embodiments, the sleep session data may be available to the user device upon completion of a session. In some embodiments, portions of the sleep session data (e.g., metrics about respiratory rate or respiratory waveforms) can be received in real-time relative to when the server 904 generates and sends these portions. Other portions of the sleep session data can be sent upon an end of the sleep session. Any remaining or all portions of the sleep session data can be made available upon demand from the user device 906.

The server 904 also receives the radar data 910, the measurement data 920, the historical data 930, and timing data of the boot time 936. The boot time 936 can be used to determine whether the historical data 930 is usable to generate an input for estimating the ambient temperature. For instance, the boot time 936 can indicate that the sleep monitoring device has restarted within a time period from a time corresponding to when the latest historical data was generated. In particular, the sleep monitoring device 902 may have been powered ON recently at a first time (e.g., within the last fifteen minutes), but the last generated historical data dates back to sometime away from the first time (e.g., two days ago). In this case, the historical data 930 may not be usable because it is stale. In another illustration, the sleep monitoring device 902 may have been powered ON recently at a first time (e.g., within the last fifteen minutes), but the last generated historical data dates is also very recent (e.g., within the last fifteen minutes). In this case, the historical data 930 may not be usable because it is too fresh and may fall within a time window during which the radar board of the sleep monitoring device 902 is being warmed up and/or calibrated. In some other illustrations, the boot time can indicate that the sleep monitoring device 902 has booted outside of a time period from a time corresponding to when the latest historical data was generated. For instance, the boot time 936 may indicate that the sleep monitoring device 902 may have been powered ON some time ago (e.g., three hours ago). In such illustrations, historical data spanning the last two hours can be usable.

The server 904 can host a machine learning model 940 that generates an output 960 based on input. The output 960 includes an estimation of the ambient temperature 960 and can be sent to the user device 906 (e.g., for presentation thereat), to the sleep monitoring device 902, and/or to other devices (e.g., to a control device that may control the air flow to and/or temperature of the space where the sleep monitoring device 902 is located).

The input can be generated based on the measurement data 920 and the historical data 940 (assuming that the historical data 930 is usable). For instance, the input can include the sensor data from the measurement data 920, where the sensor data indicates operational temperature(s). The input can also include EMAs of the sensor data over the last two hours and EMAs of the power consumption.

In addition, the server 904 can include a pre-processor 950 that may process some or all of the measurement data 910 and/or historical data 930. For instance, pre-processor 950 may remove outlier data and extrapolate missing data. In addition, the pre-processor 950 can generate new EMA data as needed (e.g., in case when the historical data may not be usable).

Figure 10:
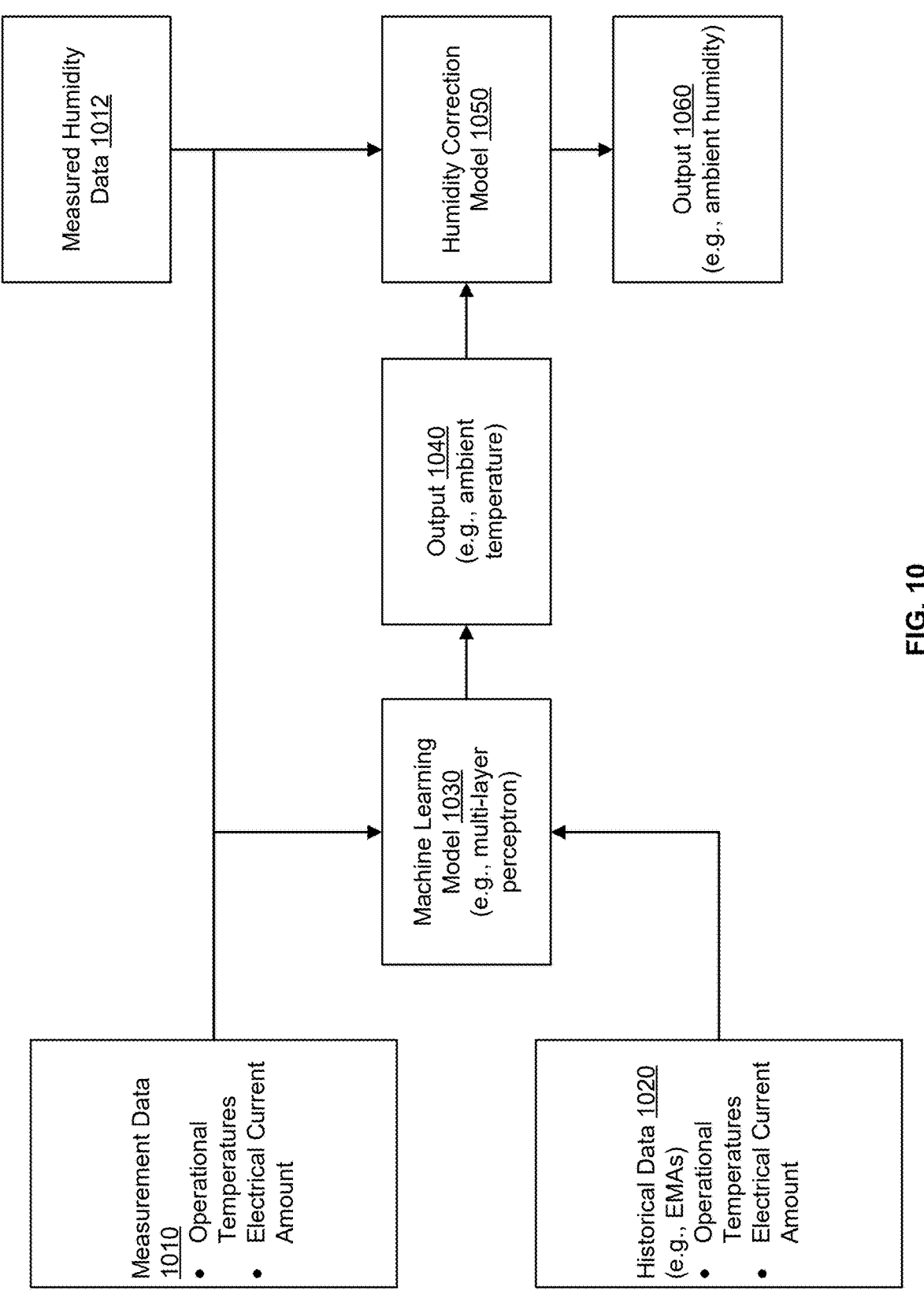
FIG. 10 illustrates an embodiment of inputs to a machine learning model usable to estimate an ambient temperature and to a humidity correction model usable to estimate an ambient humidity.

FIG. 10 illustrates an embodiment of inputs to a machine learning model 1030 usable to estimate an ambient temperature and to a humidity correction model 1050 usable to estimate an ambient humidity. The machine learning model 1030 can be an example of the machine learning model 940 of FIG. 9. In the illustration of FIG. 10, the machine learning model 1030 includes a multi-layer perceptron. Based on the inputs, the multi-layer perceptron can generate an output 1040, such as one indicating an estimation of the ambient temperature.

The inputs can be of two types. A first type includes measurement data 1010, similar to the measurement data 450 of FIG. 4. The second type includes historical data 1020, which can be derived from stored measurement data by applying a statistical function thereto. In FIG. 10, the statistical function includes an EMA function.

In an example, the measurement data 1010 indicates operational temperatures by including sensor data generated by sensors of the device. Referring back to the device 802 of FIG. 8, the sensors can include a temperature sensor and a thermistor of a radar board and a thermistor and a temperature sensor of an MLB. The sensors can also include a set of current sensors indicating a power consumption of the device (e.g., based on measured electrical current amounts) or power consumptions of components thereof.

In an example, the historical data 1020 includes EMAs of the operational temperature(s) and of the power consumption(s). An EMA can be generated from corresponding data stored in association with a past time period within a past time window. Equation 1 described herein above can be used to generate the EMA.

Predicting relative humidity uses a different technique from predicting temperature. Relative humidity is the ratio of partial vapor pressure of water in air to saturation vapor pressure of water at that room temperature. The saturation vapor pressure of water is a function of temperature and is independent of atmospheric pressure or altitude. The saturation vapor pressure of water can be calculated using the August-Roche-Magnus equation as shown in equation 2. In equation 2, $e_s(T)$ represents the saturation vapor pressure of water and T is the temperature in Celsius.

$$e_s(T) = 6.1094 \ \exp\frac{(17.625T)}{T + 243.04}. \qquad \text{Equation 2}$$

The device (e.g., the device 802) can also include a humidity sensor that provides the relative humidity based on measurement of the moisture content in air and saturation vapor pressure at the board temperature. The saturation vapor pressure instead may be calculated based on the ambient temperature indicated by the output 1040. To estimate the correct relative humidity, the output 1040, temperature sensor data measured by a temperature sensor of the device (which can be part of the measurement data 1010) and measured humidity data 1012 (e.g., an output of the humidity sensor) can be input to the humidity correction model 1050. This model 1050 can generate an output 1060 that indicates the ambient humidity, which is a corrected humidity based on the humidity measured by the humidity sensor and the ambient temperature (e.g., where the correct saturation vapor pressure is estimated based on the estimated ambient temperature).

In an example, operations of the humidity correction model 1050 includes receiving the temperature sensor data and the measured humidity data 1012, calculating $e_s(T)$ using equation 2, calculating the partial vapor pressure of water ($p_s$) from $RH_s * e_s = p_s$, receiving the ambient temperature ($T_p$), calculating the saturation vapor of water at the ambient temperature $T_p$ (where $$e_s(T) = 6.1094 \ \exp\frac{(17.625T_p)}{T_p + 243.04},$$

and calculating the corrected relative humidity $$RH_C = \frac{p_s}{e_S(T_p)}.$$

Figure 11:
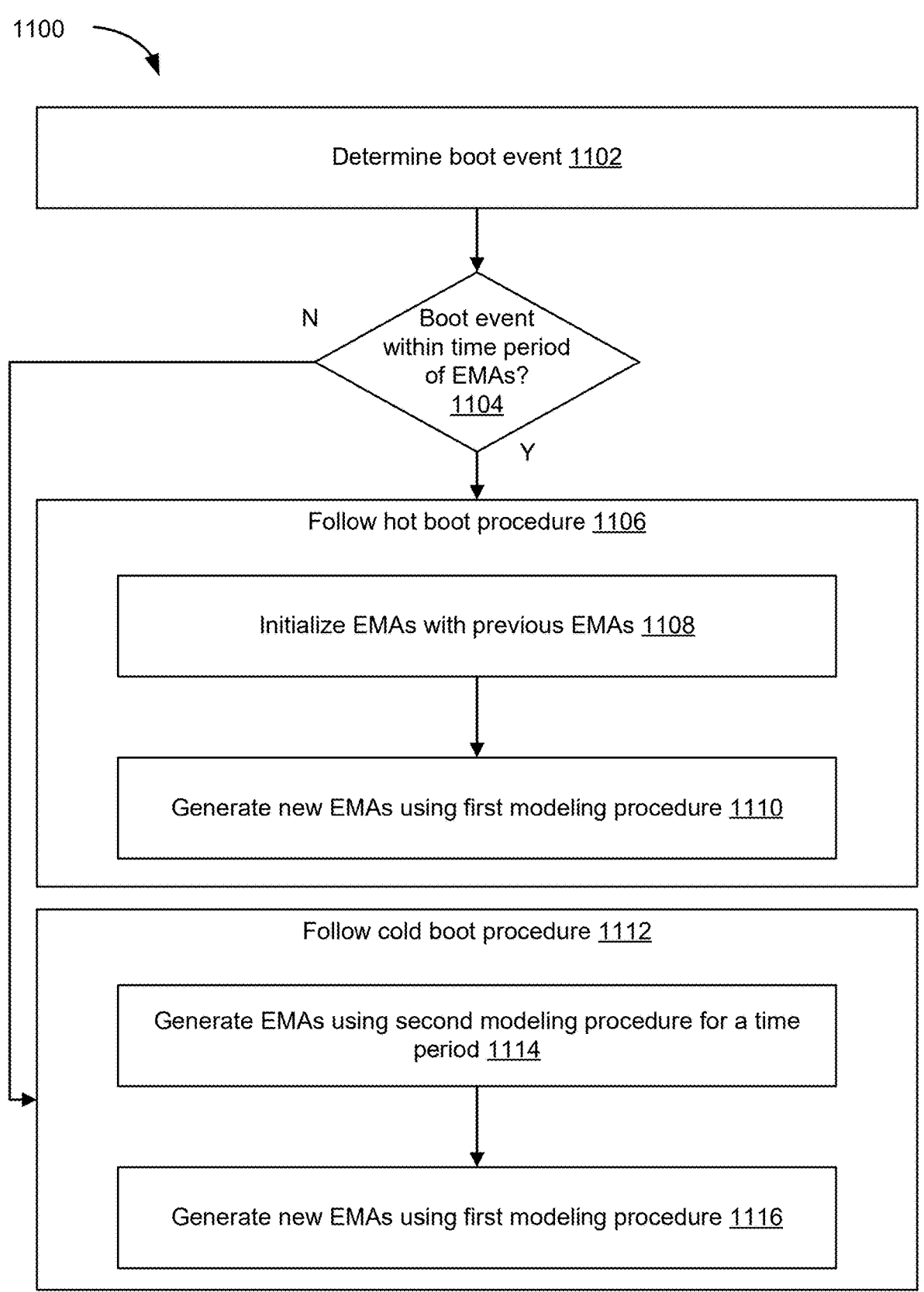
FIG. 11 illustrates an embodiment of a flow for generating historical data usable to estimate an ambient temperature.

FIG. 11 illustrates an embodiment of a flow 1100 for generating historical data usable to estimate an ambient temperature. In the illustration of FIG. 11, the historical data includes EMAs. Operations of the flow 1100 can be performed by a device, such as the device 402 of FIG. 4 or the device 802 of FIG. 8. Some or all of the instructions for performing the operations can be implemented as hardware circuitry and/or stored as computer-readable instructions on a non-transitory computer-readable medium of the device. As implemented, the instructions represent modules that include circuitry or code executable by processor(s) of the device. The use of such instructions configures the device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered. Furthermore, although the operations are illustrated as being performed by the device, some or all of these operations can be similarly performed on a server communicatively coupled with the device (e.g., the server 204 of FIG. 2 or the server 904 of FIG. 9).

As illustrated, the flow 1100 may start at operation 1102, where the device determines a boot event. For instance, the boot event can be a powering ON of the device or a transition of the device from a power save mode or idle mode to an operational mode in which one or more functionalities of the device can become available and can trigger a power consumption.

In an example, the flow 1100 may also include operation 1104, where the device determines whether the boot event is within a time period of previously generated and stored EMAs. For instance, the time period can be predefined (e.g., fifteen minutes). The EMAs can be associated with time stamps corresponding to the time at which the EMAs are generated and/or stored. The timing of the boot event can be compared to the timing of the latest EMAs. If the comparison indicates that the boot event is within the time period, operation 1106 can follow operation 1104 to perform a hot boot procedure. Otherwise, operation 1112 can follow operation 1104 to perform a cold boot procedure.

In an example, the flow 1100 may also include operation 1106, where this operation can include a sub-operation 1108 and a sub-operation 1110. At sub-operation 1108, the device initializes the EMAs with previously generated and stored EMAs (e.g., the EMAs from the last fifteen minutes). After that point, sub-operation 1110 can be performed by generating new EMAs using a first modeling procedure. The first modeling procedure can include equation 1 and can be applied to new measurement data.

In an example, the flow 1100 may also include operation 1112, where this operation can include a sub-operation 1114 and a sub-operation 1116. At sub-operation 1114, the device does not initialize the EMAs with previously generated and stored EMAs. Instead, the second modeling procedure is applied to new measurement data. The second modeling procedure can compute fast-EMAs using the following equation 3. In particular, fast-EMAs are a modification to the equation 1. Slower EMAs are dominated by the first value until a significant time history has passed. To overcome this long history (which may not be available in the cold boot case), the alpha value is modified as shown in equation 3:

$$\alpha = \frac{2}{\min\left(\frac{t}{T}, N\right) + 1} \quad T = \text{sample rate } (10s).$$

After that point (e.g., after the first two hour), sub-operation 1116 can be performed by generating new EMAs using the first modeling procedure. The first modeling procedure can include equation 1 and can be applied to subsequent measurement data.

FIG. 12 illustrates another embodiment of a flow 1200 for using a machine learning model to estimate an ambient temperature. Operations of the flow 1200 can be performed by a server, such as the server 204 of FIG. 2 or the server 904 of FIG. 9. Some or all of the instructions for performing the operations can be implemented as hardware circuitry and/or stored as computer-readable instructions on a non-transitory computer-readable medium of the server. As implemented, the instructions represent modules that include circuitry or code executable by processor(s) of the server. The use of such instructions configures the server to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

As illustrated, the flow 1200 may start at operation 1202, where the server receives measurement data. For instance, the measurement data is received from a device (e.g., the device 802 of FIG. 8) at particular rate (e.g., every thirty minutes), corresponds to the measurement data 920 of FIG. 9, and can be generated by one or more components of the device. For instance, the measurement data includes sensor data generated by a set of thermistors and temperature sensors of the device.

In an example, the flow 1200 may also include operation 1204, where the server stores the measurement data. For instance, the measurement data is stored in a memory of the server at the particular rate, such as every thirty minutes. The server can also pre-process the measurement data by removing outliers and extrapolating missing data.

In an example, the flow 1200 may also include operation 1206, where the server receives historical data, and where the historical data is generated based on measurement data stored by the device. For example, the historical data includes EMAs generated from each type of measurement data at particular rates (e.g., every one-hundred twenty seconds, every three-hundred seconds, every six-hundred seconds, and/or other time periods) over a time window (e.g., the past two hours). Equation 1 can be used to generate the EMAs. In the case of a cold boot, Equation 3 can be used to generate the EMAs.

In an example, the flow 1200 may also include operation 1208, where the server stores the historical data. For instance, the historical data is stored in the memory of the device at the particular rate, such as every thirty minutes. The server can also pre-process the historical data by removing outliers and extrapolating missing data.

In an example, the flow 1200 may also include operation 1210, where the server generates an input to a machine learning model based on the measurement data and the historical data. For instance, the latest sensor data indicating operational temperature(s) and stored in the memory are included in the input. Further, the EMAs that span the time window (e.g., the past two hours) and generated from such sensor data and from sensor data indicating power consumption(s) are included in the input. The machine learning model can be hosted locally on the server and the input can be provided thereto as a feature vector.

In an example, the flow 1200 may also include operation 1212, where the server determines the ambient temperature based on an output of the machine learning model. For instance, the output is based on the input and indicates an estimation of the ambient temperature. In addition, the server can use a humidity correction model, such as the humidity correction model 1050 of FIG. 10, to output an estimation of ambient humidity based on the ambient temperature.

In an example, the flow 1200 may also include operation 1214, where the server initiates action based on ambient temperature (and, optionally, based on the ambient humidity). For instance, the device can be used as an ambient sensor temperature (or, more generally, as a thermostat) to control, at least in part, an operation of a heating and/or cooling system based on the ambient sensor. The action can be initiated by including control data to increase, decrease, or maintain an air flow of such a system.

Figure 13:
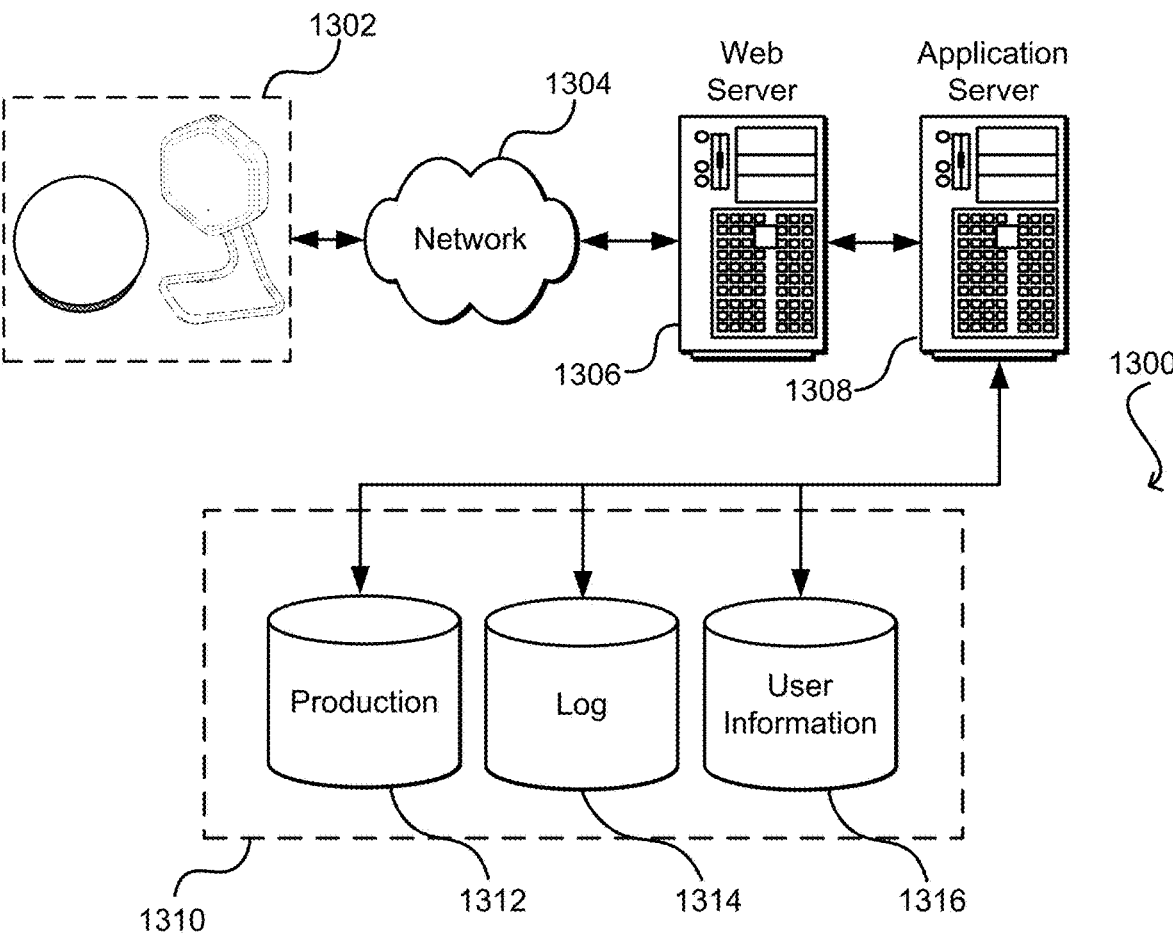
FIG. 13 illustrates aspects of an example environment for implementing aspects in accordance with various embodiments.

FIG. 13 illustrates aspects of an example environment for implementing aspects in accordance with various embodiments. As will be appreciated, although a Web-based environment is used for purposes of explanation, different environments may be used, as appropriate, to implement various embodiments. The environment includes an electronic client device 1302 (e.g., the device 402 or the device 802), which can include any appropriate device operable to send and receive requests, messages, or information over an appropriate network 1304 and convey information back to a user of the device. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
one or more processors; and
one or more memory storing computer-readable instructions that, upon execution by the one or more processors, configure the system to:
determine first data that indicates an operational temperature of a device, the first data generated by a sensor of the device;
determine second data that indicates a power consumption of the device;
determine historical operational temperature data of the device;
determine historical power consumption data of the device;
generate an input based on the first data, the second data, the historical operational temperature data, and the historical power consumption data;

provide the input to a machine learning model, wherein the machine learning model is trained to predict ambient temperature information;

determine, using the machine learning model and the input, an ambient temperature of an external environment to the device and in which the device is located; and cause, based at least in part on the ambient temperature, control of heating or cooling system of the external environment.

2. The system of claim 1, wherein the one or more memory store further computer-readable instructions that, upon execution by the one or more processors, configure the system to:

cause a speaker of the device to output audio based at least in part on audio data;

determine an audio envelope of the audio data, wherein the audio envelope indicates the power consumption;

determine an audio volume associated with the outputting of the audio;

determine a light characteristic that comprises at least one of a color of emitted light by a light source of the device or a brightness of the emitted light; and include, in the input, the audio volume and the light characteristic.

3. The system of claim 1, wherein the sensor includes a first temperature sensor, wherein the operational temperature includes a first operational temperature, wherein the second data is generated by a current sensor of the device, and wherein the one or more memory store further computer-readable instructions that, upon execution by the one or more processors, configure the system to:

determine third data that indicates a second operational temperature of a wireless component of the device, wherein the third data is generated by a second temperature sensor of the wireless component, wherein the input to the machine learning model is further generated based at least in part on the third data.

4. A computer-implemented method comprising:

determining first data that indicates an operational temperature of a device, the first data generated by a sensor of the device;

determining second data that indicates a power consumption of the device; and determining, based at least in part on the first data and the second data, an ambient temperature of an external environment to the device and in which the device is located.

5. The computer-implemented method of claim 4, wherein determining the ambient temperature further comprises:

generating an input based at least in part on the first data and the second data;

providing the input to a machine learning model, wherein the machine learning model is trained to predict ambient temperature information; and outputting, by the machine learning model based on the input, a prediction for the ambient temperature.

6. The computer-implemented method of claim 4, further comprising:

determining, third data that indicates historical values of the operational temperature over a first period of time, wherein the first data is part of the third data;

determining fourth data that indicates historical values of the power consumption over a second period of time, wherein the second period of time is the same or different from the first period of time and the second data is part of the fourth data;

generating an input based at least in part on the third data and the fourth data;

providing the input to a machine learning model, wherein the machine learning model is trained to predict ambient temperature information; and outputting, by the machine learning model based on the input, a prediction for the ambient temperature.

7. The computer-implemented method of claim 4, further comprising:

causing a speaker of the device to output audio based at least in part on audio data; and determining the second data based at least in part on the audio data, wherein the power consumption corresponds to the outputting of the audio.

8. The computer-implemented method of claim 7, further comprising:

determining an audio envelope of the audio based at least in part on the audio data, wherein the second data is generated based at least in part on the audio envelope;

generating an input based at least in part on the first data and the second data;

providing the input to a machine learning model, wherein the machine learning model is trained to predict ambient temperature information; and outputting, by the machine learning model based on the input, a prediction for the ambient temperature.

9. The computer-implemented method of claim 7, further comprising:

determining an audio volume associated with the outputting of the audio;

determining a light characteristic that comprises at least one of a color of emitted light by a light source of the device or a brightness of the emitted light;

generating an input to a machine learning model based at least in part on the first data, the second data, the audio volume, and the light characteristic;

providing the input to a machine learning model, wherein the machine learning model is trained to predict ambient temperature information; and outputting, by the machine learning model based on the input, a prediction for the ambient temperature.

10. The computer-implemented method of claim 4, wherein the second data is generated by a current sensor of the device, and determining the ambient temperature further comprising:

generating an input based at least in part on the first data and the second data;

providing the input to a machine learning model, wherein the machine learning model is trained to predict ambient information; and outputting, by the machine learning model based on the input, a prediction for the ambient temperature.

11. The computer-implemented method of claim 4, wherein the sensor includes a first temperature sensor, wherein the operational temperature includes a first operational temperature, wherein the second data is generated by a current sensor of the device, and further comprising:

determining third data that indicates a second operational temperature of a wireless component of the device, wherein the third data is generated by a second temperature sensor;

generating an input based at least in part on the first data, the second data, and the third data;

providing the input to a machine learning model, wherein the machine learning model is trained to predict ambient information; and outputting, by the machine learning model based on the input, a prediction for the ambient temperature.

12. The computer-implemented method of claim 4, wherein the second data is generated by a current sensor of the device, and further comprising:

determining third data that indicates a humidity of the external environment, wherein the humidity is measured at the operational temperature by the device; and determining a corrected humidity of the external environment based at least in part on the humidity and the ambient temperature.

13. A system comprising:

one or more processors; and one or more memory storing computer-readable instructions that, upon execution by the one or more processors, configure the system to:

determine first data that indicates an operational temperature of a device, the first data generated by a sensor of the device;

determine second data that indicates a power consumption of the device and a historical power consumption of the device, wherein the second data is generated by the device or is based at least in part on operational data of the device; and determine, based at least in part on the first data and the second data and without using an ambient temperature sensor, an ambient temperature of an external environment to the device and in which the device is located.

14. The system of claim 13, wherein the one or more memory store further computer-readable instructions that, upon execution by the one or more processors, configure the system to:

determine third data that indicates first historical values of the operational temperature, wherein the first data is part of the third data;

determine fourth data that indicates second historical values of the power consumption, wherein the second data is part of the fourth data;

generate an input based at least in part on the third data and the fourth data;

provide the input to a machine learning model, wherein the machine learning model is trained to predict ambient temperature information; and output, by the machine learning model based on the input, a prediction for the ambient temperature.

15. The system of claim 14, wherein the first historical values include exponential moving averages (EMAs) of the operational temperature over a first period of time, wherein the second historical values include EMAs of the power consumption over a second period of time, and wherein the second period of time is different from the first period of time.

16. The system of claim 13, wherein the one or more memory store further computer-readable instructions that, upon execution by the one or more processors, configure the system to:

determine, at a first time, third data that indicates historical values of the operational temperature;

determine, at a second time, fourth data that indicates historical values of the power consumption;

determine that the device has booted within a time period from at least one of the first time or the second time;

retrieve, from the one or more memory, the third data and the fourth data;

generate an input based at least in part on the third data and the fourth data;

provide the input to a machine learning model, wherein the machine learning model is trained to predict ambient temperature information; and output, by the machine learning model based on the input, a prediction for the ambient temperature.

17. The system of claim 13, wherein the one or more memory store further computer-readable instructions that, upon execution by the one or more processors, configure the system to:

store, in the one or more memory at a first time, third data that indicates first historical values of the operational temperature and fourth data that indicates first historical values of the power consumption;

determine that the device has booted outside of a time period from the first time;

determine, at a second time after the first time, fifth data that indicates second historical values of the operational temperature;

determine, at a third time after the first time, sixth data that indicates second historical values of the power consumption;

generate an input based at least in part on the fifth data and the sixth data;

provide the input to a machine learning model, wherein the machine learning model is trained to predict ambient temperature information; and output, by the machine learning model based on the input, a prediction for the ambient temperature.

18. The system of claim 13, wherein the one or more memory store further computer-readable instructions that, upon execution by the one or more processors, configure the system to:

generate, based at least in part on the first data, third data that indicates historical values of the operational temperature;

generate, based at least in part on the second data, fourth data that indicates historical values of the power consumption;

generate an input based at least in part on the third data and the fourth data;

provide the input to a machine learning model, wherein the machine learning model is trained to predict ambient temperature information; and output, by the machine learning model based on the input, a prediction for the ambient temperature.

19. The system of claim 13, wherein the one or more memory store further computer-readable instructions that, upon execution by the one or more processors, configure the system to:

receive, from the device, third data that indicates historical values of the operational temperature, wherein the first data is part of the third data;

receive, from the device, fourth data that indicates historical values of the power consumption, wherein the second data is part of the fourth data;

generate an input based at least in part on the third data and the fourth data;

provide the input to a machine learning model, wherein the machine learning model is trained to predict ambient temperature information; and output, by the machine learning model based on the input, a prediction for the ambient temperature.

20. The system of claim 13, wherein the one or more memory store further computer-readable instructions that, upon execution by the one or more processors, configure the system to:

generate an input to a machine learning model based at least in part on the first data and the second data, wherein the machine learning model is trained to predict ambient temperature information, and wherein the ambient temperature is determined as an output of the machine learning model; and cause, based at least in part on the ambient temperature, control of heating or cooling system of the external environment.

* * * * *